United States Patent [19]
Ohsawa

[11] Patent Number: 5,107,290
[45] Date of Patent: Apr. 21, 1992

[54] CAMERA

[75] Inventor: Toshifumi Ohsawa, Tokyo, Japan

[73] Assignee: Canon Kabushiki Kaisha, Tokyo, Japan

[21] Appl. No.: 533,533

[22] Filed: Jun. 5, 1990

[30] Foreign Application Priority Data

| Jun. 6, 1989 | [JP] | Japan | 1-143364 |
| Jun. 6, 1989 | [JP] | Japan | 1-143365 |
| Jun. 6, 1989 | [JP] | Japan | 1-143366 |
| Jun. 6, 1989 | [JP] | Japan | 1-143367 |
| Jun. 6, 1989 | [JP] | Japan | 1-143368 |

[51] Int. Cl.$^5$ .............................. G03B 1/00; G03B 1/66
[52] U.S. Cl. ................................. 354/173.1; 354/214; 354/215
[58] Field of Search ............ 354/214, 173.1, 215, 354/170, 171, 212

[56] References Cited

U.S. PATENT DOCUMENTS 4,903,060 2/1990 Hoshino et al. ............... 354/173.1

FOREIGN PATENT DOCUMENTS 42-7827 3/1967 Japan.
48-43810 12/1973 Japan.
1-202723 8/1989 Japan.

Primary Examiner—W. B. Perkey
Attorney, Agent, or Firm—Fitzpatrick, Cella, Harper & Scinto

[57] ABSTRACT

A camera includes a motorized film winding mechanism, a motorized film rewinding mechanism, a winding control circuit with two selectable modes, in one of which every frame of the film is exposed and in the other the film is wound with a frame left unexposed, a memory for memorizing the position of the unexposed frame when the second winding mode is selected, a rewinding control circuit with two selectable modes, in one of which the film is continuously rewound and in the other the film is stopped with the unexposed frame in registry with the exposure aperture, a first selecting circuit for selecting the second winding mode and a second selecting circuit for causing the rewinding control circuit to operate in the second rewinding mode when the second winding mode has been selected.

20 Claims, 16 Drawing Sheets

| INPUT | | MOTOR CONTROL |
|---|---|---|
| IN1 | IN2 | |
| 0 | 0 | SHORT-CIRCUIT BRAKE |
| 1 | 0 | POWER SUPPLY FOR NORMAL ROTATION |
| 0 | 1 | POWER SUPPLY FOR REVERSE ROTATION |
| 1 | 1 | OPEN |

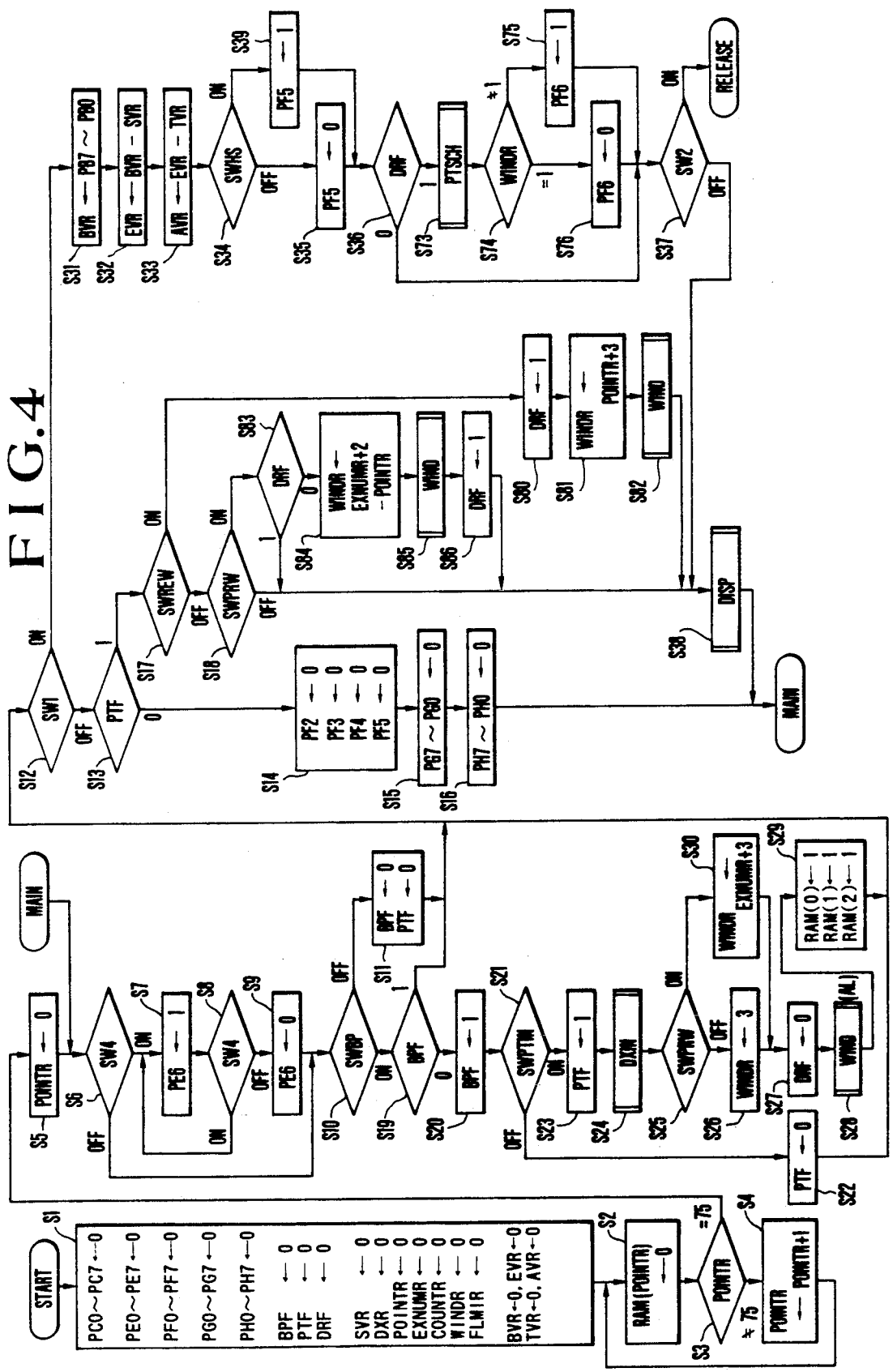

| 8 | 9 | 10 | CONTENT |
|---|---|---|---|
| – | – | – | NON-DX |
| ON | – | – | 12 EX |
| – | ON | – | 20 EX |
| ON | ON | – | 24 EX |
| – | – | ON | 36 EX |
| ON | – | ON | UNDEFINED |
| – | ON | ON | UNDEFINED |
| ON | ON | ON | 72 EX |

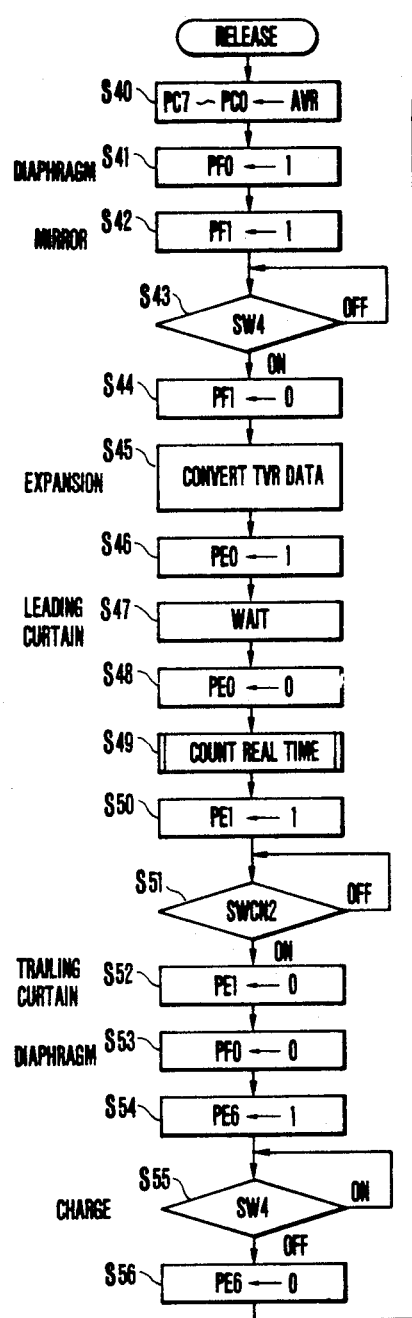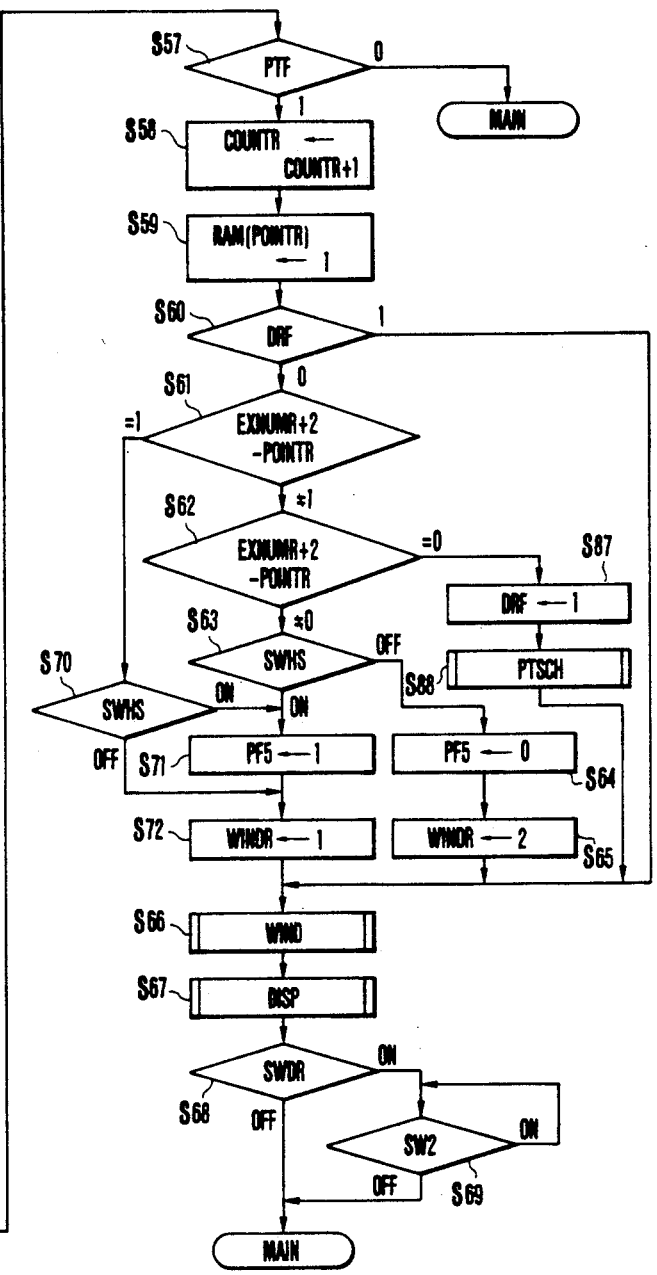
FIG.9

B
SIGNAL BASE DISC

F I G.13 (a) 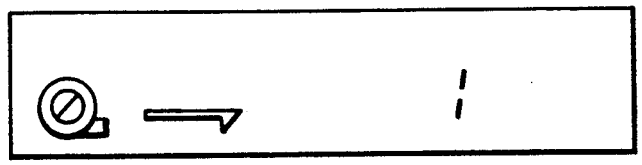
F I G.13 (b) 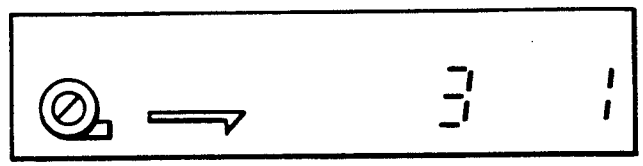
F I G.13 (c) 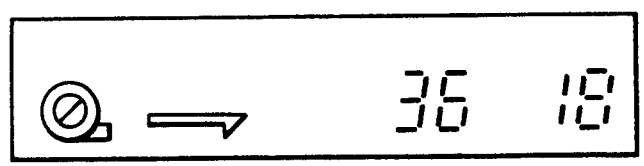
F I G.13 (d) 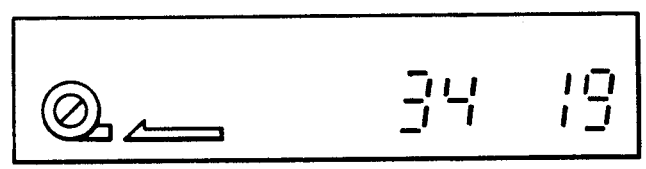
F I G.13 (e) 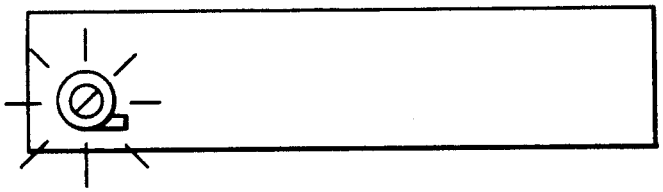
F I G.13 (f) 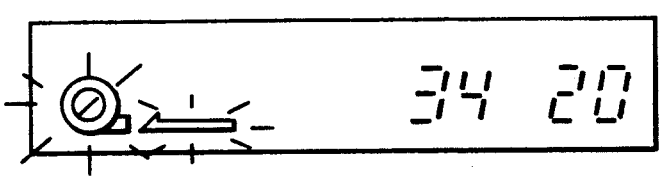
F I G.13 (g) 
F I G.13 (h) 

CAMERA

BACKGROUND OF THE INVENTION

1. Field of the Invention

This invention relates to a camera having motorized film winding and rewinding capabilities.

2. Description of the Related Art

To motorize the transporting of film in making an automatic camera, there are the following two transportation methods:

(1) Setting a film cartridge→automatic loading with blank advance (equivalent usually to three frames) to the first frame usable for shooting→winding the film by one frame for every shot→detecting the film end→transporting all the exposed frames backward thus rewinding the entire length of the pulled-out film into the cartridge.

(2) Setting a film cartridge→pre-winding the film so that all usable frames are previously wound onto the takeup spool→transporting the film backward by one frame for every shot→after the last usable frame has been exposed, rewinding the remaining area of the film continuously into the cartridge.

With the camera employing the above-described method (1), however, the time lag from the termination of the exposure of the last frame in the preceding film cartridge to the initiation of an exposure of the first frame in the current film cartridge is very long, because the completion of exposing all film has to be followed by the rewinding of the film through the entire length.

In the camera of the above-described method (2), the first shot cannot be taken until the film is all of the frames of film are unwound from the film cartridge upon its being loaded into the camera. Hence, the film exchange also results in a long time lag to the start of shooting.

The minimization of a time it takes to continuously wind or rewind the film through the length of all frames is restricted by the electrical power source, the motors, etc. the camera is able to accommodate. Taking an example of 36-exposure film, even the fast camera takes some 10 seconds, while the slow camera consumes a longer time than 20 seconds. This means that, for the professional cameraman or the equivalent, it will happen in some cases that good shutter chances are missed by the time lag of 10 to 20 seconds as the film is exchanged. An improvement is desired.

So, a previous proposal for the improvement has been made in which once the winding lever is cocked, the film is advanced through the length of two frames so that every other frame is exposed in sequence as the film is wound, and, after the film has been wound up to all the frames, the remaining every other frame starts to be exposed in sequence as the film is rewound by the same winding lever. Cameras of such a two-way exposure type are known in Japanese Patent Publications. Nos. Sho 42-7827 and Sho 48-43810 and others.

In addition, Japanese Laid-open Patent Application No. Hei 1-202723 discloses that the above-described advancing of film is performed by motor drive.

SUMMARY OF THE INVENTION

One aspect of this invention is to further improve the conventional camera of the above-described two-way exposure type and to provide a camera in which the film winding and rewinding are motorized, and when priority is given to the frame speed, for example, in a continuous shooting mode, the two-way exposure mode is cancelled, thereby making it possible to eliminate the demerit of the two-way exposure method.

One aspect of this invention is to further improve the conventional camera of the two-way exposure type and to provide a camera in which the film winding and rewinding are motorized, and which includes a first winding control in which the film is wound by every frame and a second winding control in which the film is wound in such a manner as to leave unexposed frames between exposed frames are made selectable and the rewinding control also changes to change depending on the selected winding control, thus making it possible to operate the mode suited to a given situation.

The other aspects will become apparent from the following description.

BRIEF DESCRIPTION OF THE DRAWINGS:

FIG. 3(*b*) is a table for explaining a manner in which the motor of FIG. 3(*a*) operates.

FIG. 4 is a flowchart (main stream).

FIG. 9 is a flowchart (main stream continuation).

FIGS. 13(*a*) to 13(*h*) are plan views of examples of displays on a display device.

DETAILED DESCRIPTION OF THE PREFERRED EMBODIMENT

Figure 1:
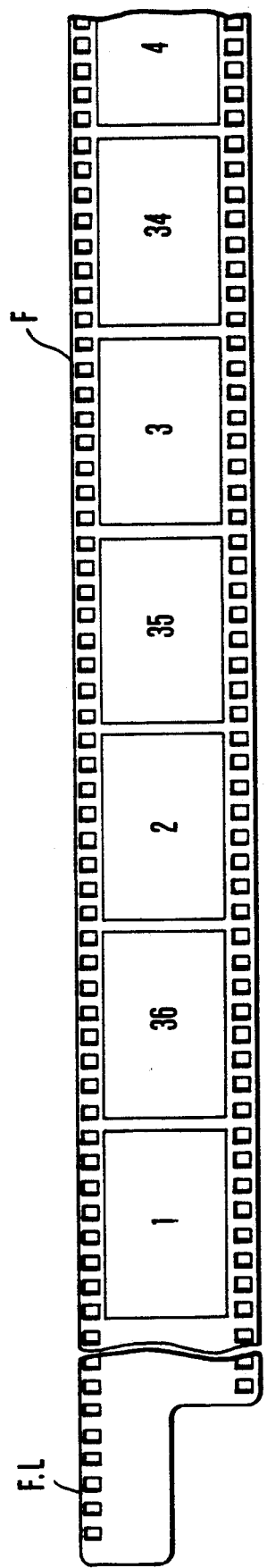
FIG. 1 is a plan view for explaining the order in which the frames of roll film are exposed by the camera of the invention.

In FIG. 1, there is shown the relationship between the frame number and the shot number on film F by the camera of the present embodiment. Counting from the film leader F.L which first winds around a takeup spool except for the area in the blank advance for automatic loading, the first frame is assigned to the first shot, the second frame to the n-th shot (where n represents the maximum number of usable frames, so that, in the case of 36-exposure film, n=36 results), the third frame to the second shot, the fourth frame to the (n−1)st shot, the fifth frame to the third shot, the sixth frame to the (n−2)nd shot, and so on. Incidentally, FIG. 1 is a view of the film F looking from the photographic lens side.

Figure 2:
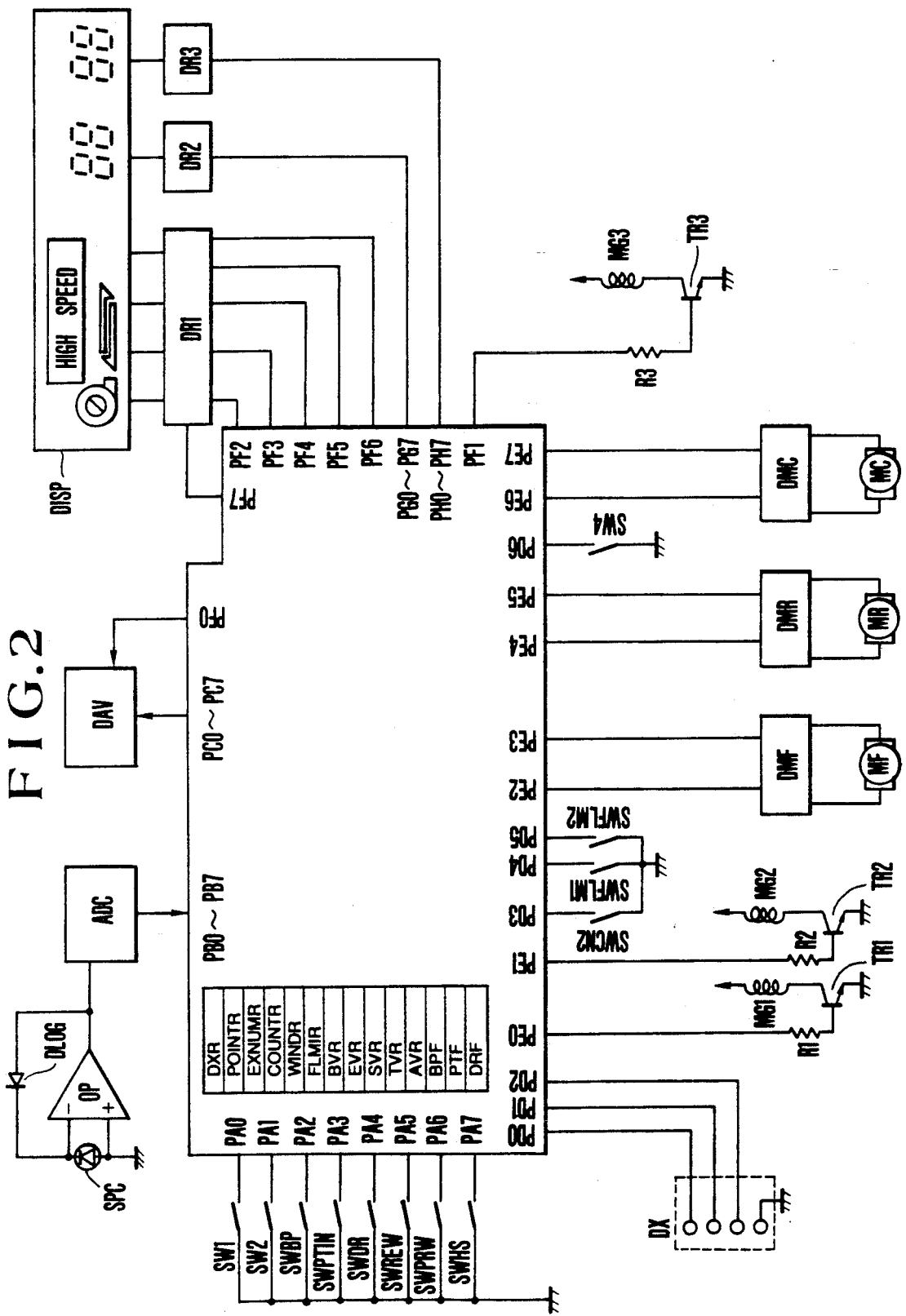
FIG. 2 is a diagram of the construction of a circuitry of the camera of the invention.

In FIG. 2, there is shown the construction of the entire circuitry of the present embodiment. A microcomputer COM for controlling the various portions of the camera has input ports PA7-PA0, input ports PB7-PB0, output ports PC7-PC0, other input ports PD6-PD0, other output ports PE7-PE0, other output ports PF7-PF0, other output ports PG7-PG0, and other output ports PH7-PH0, and contains a register DXR to which the content of the DX code on the film cartridge is input, another register POINTR for memorizing the current film position information, another register EXNUMR for memorizing the number of frames of film obtained from the DX code, another register COUNTR for memorizing the number of exposed frames, another register WINDR for memorizing the number of wound/rewound frames of film, another register FLMIR to which the counted value of the wind/rewind pulses for film is input, another register BVR to which the BV value is input, another register EVR to which the EV value is input, another register SVR to which the SV value is input, another register TVR to which the TV value is input, another register AVR to which the AV value is input, a flag BPF for detecting the closure of the back cover, another flag PTF for detecting the loading of a film cartridge and another flag DRF for indicating the direction in which the film is transported. The periphery of the microcomputer COM includes a photodiode for measuring the brightness of an object to be photographed, an operational amplifier OP, a logarithmic compression diode DLOG, an A/D converter ADC, a diaphragm drive device DAV having a stepping motor as the drive source, a display device DISP, a display driver DR1, another display driver DR2 with a 7-segment code decoder, another display driver DR3 with a 7-segment code decoder, a first stroke switch SW1 for starting light measurement, a release switch SW2, a back cover opening/closing detection switch SWBP, a cartridge loading detection switch SWPTIN, a drive mode switch SWDR, a forced rewind switch SWREW, a forced pre-wind switch SWPRW, a continuous frame shooting switch SWHS, a trailing curtain running completion switch SWCN2, a film running detection switch SWFLM1, a film stop position detecting switch SWFLM2, a mirror up/charge completion detecting switch SW4, a magnet MG1 for running the leading curtain of a shutter, another magnet MG2 for running the trailing curtain of the shutter, another magnet MG3 for raising a mirror, transistors TR1, TR2 and TR3, resistors R1, R2 and R3, motor drivers DMF, DMR and DMC, a motor MF for film winding, another motor MR for film rewinding, and another motor MC for charging the mechanisms.

Figures 3A, 3B:
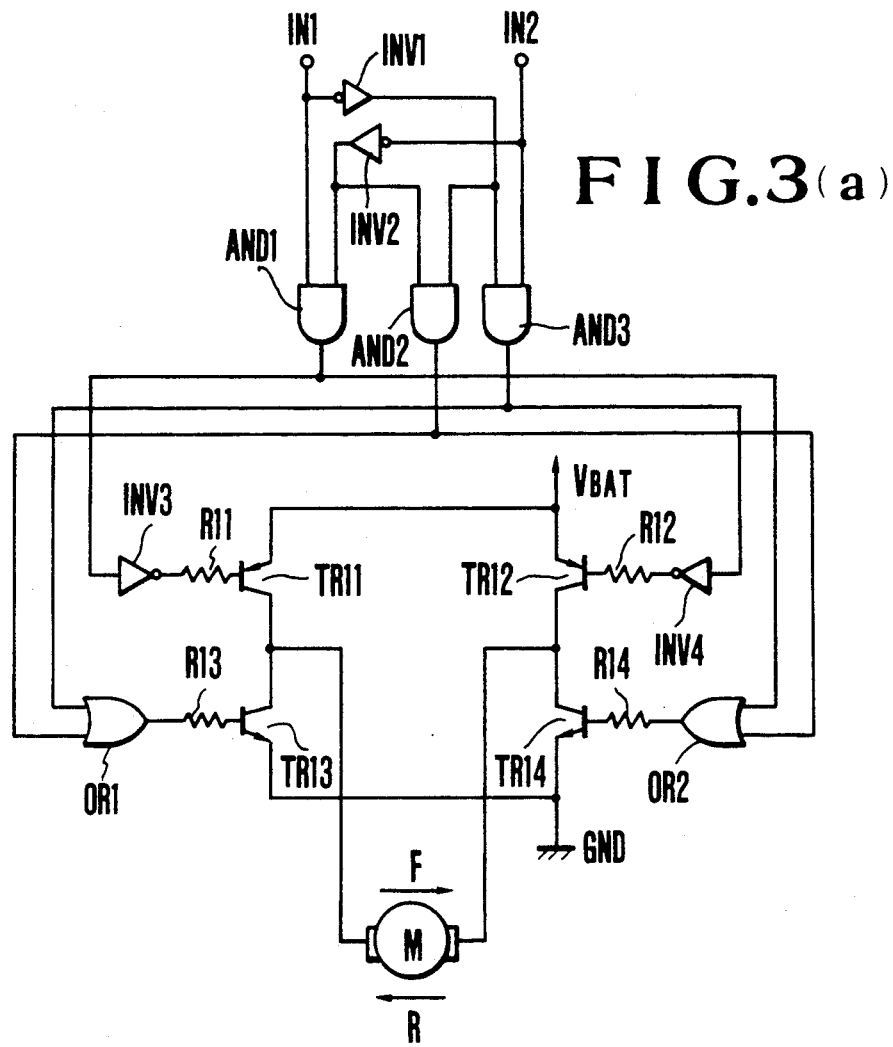
FIG. 3(*a*) is a diagram of the construction of the motor driver circuit shown in FIG. 2.

FIGS. 3(a) and 3(b) are a circuit diagram of the details of the motor driver DMF, DMR, DMC and a table for explaining the motor control. The circuit comprises input terminals IN1 and IN2, inverter gates INV1 and INV2, other inverter gates INV3 and INV4, AND gates AND1, AND2 and AND3, OR gates OR1 and OR2, resistors R11, R12, R13 and R14, PNP transistors TR11 and TR12, NPN transistors TR13 and TR14, an electric motor MF, MR or MC, an electric power source VBAT and a ground GND.

The input terminal IN1 is connected, as for the motor driver DMF, to the output port PE2 of the microcomputer COM, as for the motor driver DMR, to the output port PE4 of the microcomputer COM, and as for the motor driver DMC, to the output port PE6 of the microcomputer COM. The input terminal IN2 is connected, as for the motor driver DMF, to the output port PE3 of the microcomputer COM, as for the motor driver DMR, to the output port PE5 of the microcomputer COM, and as for the motor driver DMC, to the output port PE7 of the microcomputer COM.

If both the input terminals IN1 and IN2 receive a low-level input, the outputs of the AND gates AND1 and AND3 become low and the output of the AND gate AND2 becomes high. As a result, the transistors TR13 and TR14 are turned on so that both ends of the motor are pulled down to the ground level and a short-circuit is formed to effect braking.

If the input terminal IN1 receives a high-level input and the input terminal IN2 receives a low-level input, the output of the AND gate AND1 becomes high, and the outputs of the AND gates AND2 and AND3 become low with the result that the transistors TR11 and TR14 are turned on to allow electric current to flow in a direction F to the motor. This is temporarily called "normal rotation current supply". In the embodiment, it is assumed that the motor MF for film winding responsive to the normal rotation current supply drives film winding, the motor MR for film rewinding responsive to the normal rotation current supply drives film rewinding, and the motor MC for charging responsive to the normal rotation current supply drives charging of the mechanisms such as the shutter, and that the reverse rotation current supply to be described below has no particularly significant meaning.

If the input terminal IN1 receives a low-level input and the input terminal IN2 receives a high-level input, the outputs of the AND gates AND1 and AND 2 become low, and the output of the AND gate AND3 becomes high with the result that the transistors TR12 and TR13 are turned on to allow electric current to flow in an R direction to the motor. This is temporarily called "reverse rotation current supply". When the inputs at the input terminals IN1 and IN2 both become high, the AND gates AND1, AND2 and AND3 all produce outputs of low level, and all the transistors TR11 to TR14 are in non-conducting state. Thus both ends of winding of the motor are opened.

Figure 14A:
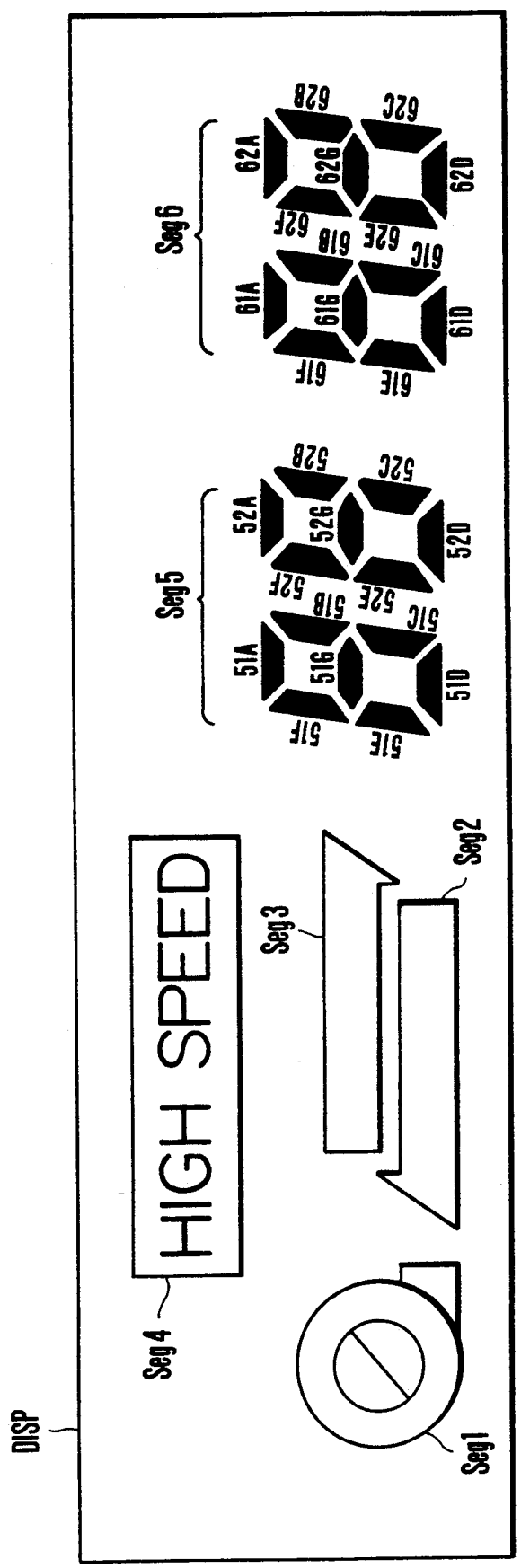
FIGS. 14(*a*) to 14(*c*) are respectively a plan view and an electric circuit diagram of the display device and the display driver.
Figure 14:
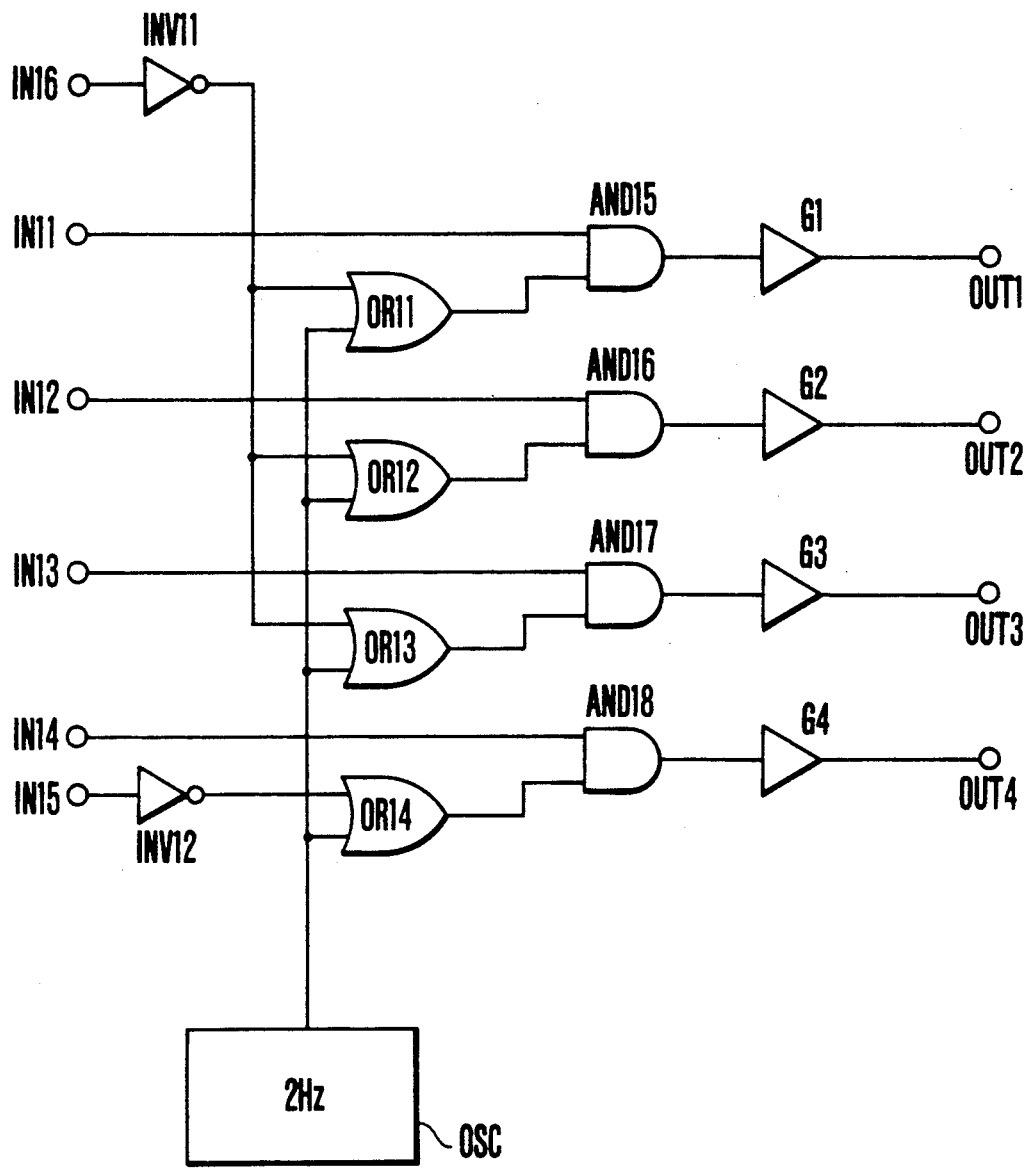
Figure 14:
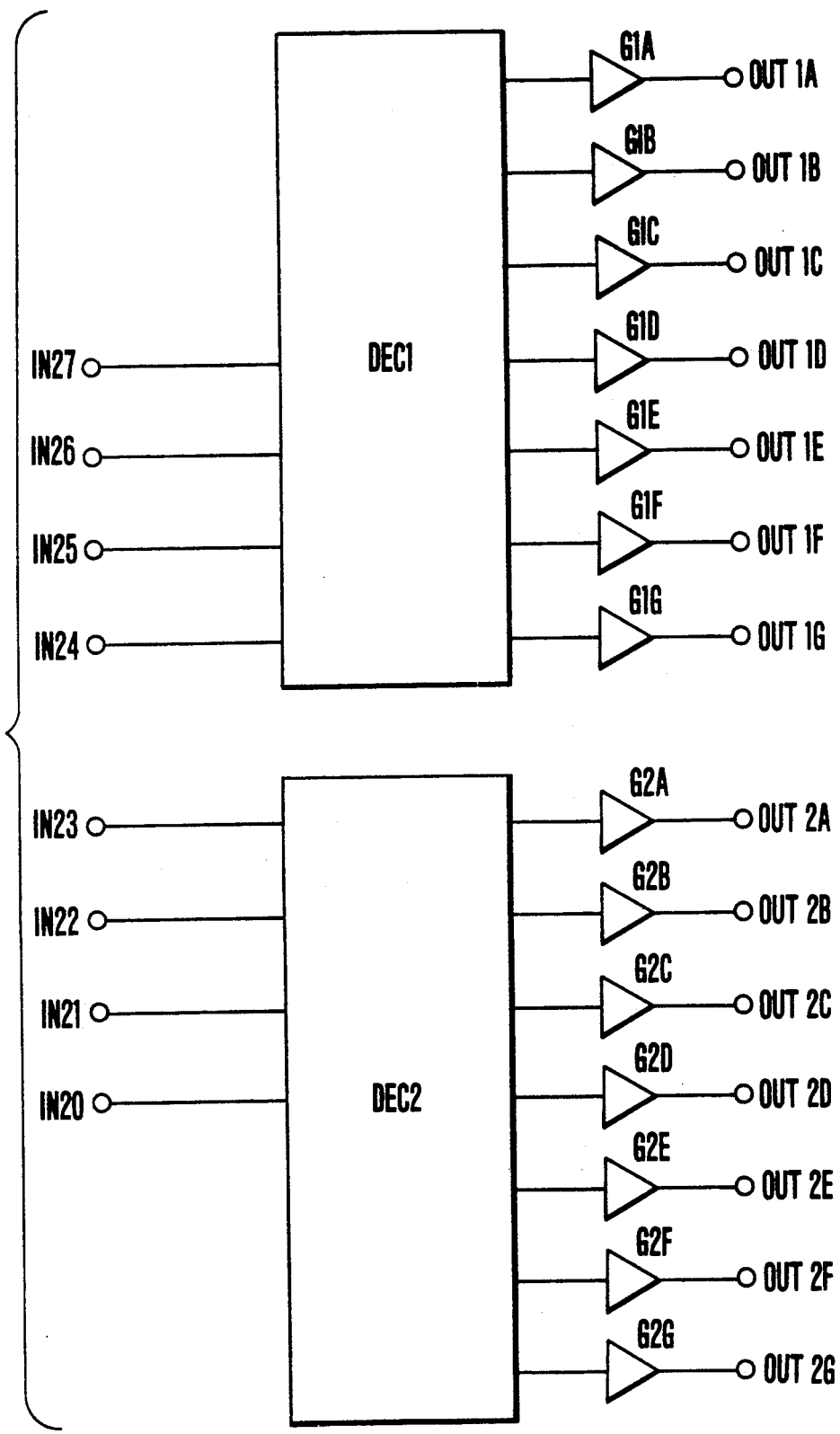

In FIGS. 14(a), 14(b) and 14(c), there are shown the details of the construction of the display device DISP and the display drivers DR1, DR2 and DR3 shown in FIG. 2. In the drawings, reference characters Seg1 to Seg4 denote display segments. A display segment block Seg5 has a set of display segments 51A-51G and another set of display segments 52A-52G. Another display segment block Seg6 has a set of display segments 61A-61G and another set of display segments 62A-62G. The display driver comprises OR gates OR1-1-OR14, AND gates AND15-AND18, inverter gates INV11 and INV12, an oscillator circuit OSC for producing an output with 2 Hz, segment drivers G1-G4, BCD-to-7-segment decoders DEC1 and DEC2, a set of segment drivers G1A-G1G and another set of segment drivers G2A-G2G.

FIG. 14(a) illustrates all the segments of the display device DISP. Of these, the display segment Seg1 represents a cartridge presence mark. The display segment Seg2 represents a film backward advance mark. The display segment Seg3 represents a film forward advance mark. The display segment Seg4 represents a continuous frame shooting mode mark. The display segment block Seg5 presents displays representing the film position. The display segment block Seg6 presents displays representing the number of exposed frames. These segment blocks Seg5 and Seg6 both are of 2-FIG. 7-segment structure and each is divided into the segments 51A-51G and 52A-52G, or the segments 61A-61G and 62A-62G.

FIG. 14(b) shows an example of construction of the display driver DR1 comprising an input terminal IN11 connected to the output port PF2 of the microcomputer COM, another terminal IN12 to the port PF3, another terminal IN13 to the port PF4, another terminal IN14 to the port PF5, another terminal IN15 to the port PF6, and another terminal IN16 to the port PF7. An output terminal OUT1 is connected so as to drive the segment Seg1 of the display device DISP, another terminal OUT2 to the segment Seg2, another terminal OUT3 to the segment Seg3, and another terminal OUT4 to the segment Seg4. The inputs in the terminals IN11-IN14 control the outputs at the terminals OUT1-OUT4. For example, when the input at the terminal IN11 changes to high level, the output at the terminal OUT1 becomes high, lighting on the segment Seg1. If, in this condition, the input terminal IN16 becomes high, the output terminal OUT1 repeats high/low in periods of 2 seconds. Thus, the segment Seg1 blinks with the frequency of 2 Hz. The segments Seg2 and Seg3 are controlled likewise. The blinking control of the segment Seg4 is made by the input terminal IN15.

FIG. 14(c) shows an example of the construction of the circuit commonly usable in the display drivers DR2 and DR3. Input terminals IN27-IN20 are connected, as for the display driver DR2, to the output ports PG7-PG0, or as for the display driver DR3, to the output ports PH7-PH0. Output terminals OUT-1A-OUT1G are connected, as for the display driver DR2, so as to drive the segments 51A-51G of the display device DISP, or as for the display driver DR3, so as to drive the are connected, as for the display driver DR2, so as to drive the segments 52A-52G of the display device DISP, or as for the display driver DR3, so as to drive the segments 62A-62G of the display device DISP. Reference characters DEC1 and DEC2 each denote a publicly known BCD-to-7-segment decoder. If it is equipped with a zero suppress function and the outputs at the output terminals PG7-PG0 and PH7-PH0 of the microcomputer COM are in BCD code form, desired displays can be presented.

Next, the operation of the circuit of FIG. 2 is described on the basis of the flowchart of FIG. 4.

When a power switch (not shown) is turned on, electric energy is given to the microcomputer COM and other circuits OP, ADC, DAV, DR1, DR2, DR3, DMF, DMR and DMC. The microcomputer COM is reset by the operation of a resetting circuit (not shown). Thus, the program begins with START in FIG. 4.

Step S1: The microcomputer COM is cleared so that the outputs at the output ports (PC, PE, PF, PG, PH) and the flags and the contents of the registers all become "0".

Figure 11:
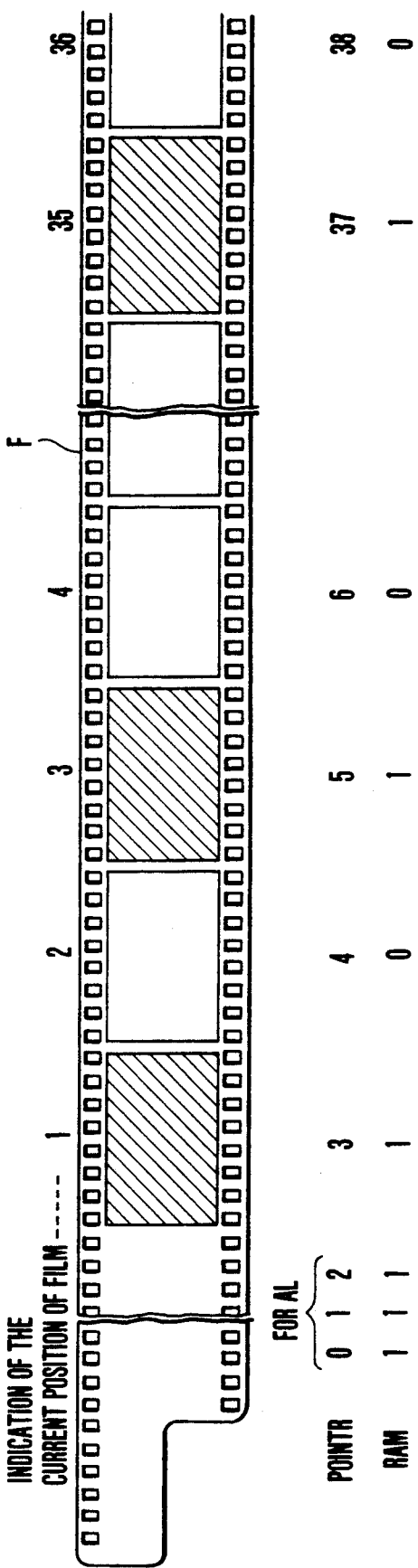
FIG. 11 is a diagram for explaining the film frame numbers, register information and RAM information.

Steps S2, S3, S4: The RAM content of the address the register POINTR indicates is cleared. Here, the content of the register POINTR represents the position (transporting state) of the film F. With inclusion of "3" for the three frames transported during the automatic loading after a film cartridge has been inserted, the content of the register POINTR is incremented by "1" each time the film F is pulled out by one frame from the cartridge. Conversely each time it is rewound by one frame, the content of the register POINTR is decremented by "1". Thus, how many frames the film has been pulled out is determined. The value stored in the RAM location at of the address in register POINTR indicates whether the individual frame the register POINTR refers to is already exposed or not yet exposed by using "1" or "0", as shown in FIG. 11. In these steps S2, S3 and S4, initial clearing of that RAM is carried out. Incidentally, the reason why it is recycled 75 times is that in the present embodiment, the maximum possible number of exposures as determined from the DX code to be described later is assumed to be "72" and the number of blank frames in the automatic loading, that is, "3" is added to this, totaling "75". When the initial clearing up to POINTR=75 is completed, the program advances to a step S5.

Step S5: Reset the register POINTR to "0".

Step S6: Check the switch SW4 which is turned on when the mirror is raised and which is turned off when charging of the shutter and other mechanisms is completed (at the same time, the mirror is lowered). If the switch SW4 is off, no action is taken and a step S10 follows. If on, a step S7 follows to do charging.

Step S7: Change the output at the port PE6 to high level. Responsive to this, the motor driver DMC gives the normal rotation current supply to the motor MC for charging, thus moving the mechanisms to the charged position.

Step S8: Wait until the switch SW4 is turned off. If "off" occurs, a step S9 follows.

Step S9: Since the charging has been completed, the output port PE6 is reset to low level to brake the motor MC for charging.

Step S10: Check the state of the switch SWBP for sensing the opening and closing of the back cover. If the back cover is open, a step S11 follows.

Step S11: Clear the back cover closure detection flag BPF and the cartridge load flag PTF.

Step S12: Check the light measuring switch SW1. If off, a step S13 follows.

Step S13: Check the content of the cartridge load flag PTF. Since it has been cleared in the step S11, a step S14 follows.

Step S14: Change the outputs at the ports PF2-PF5 to low level. Therefore, the segments Seg1-Seg4 of the display device DISP are lighted off.

Step S15: Change the outputs at the ports PG7-PG0 to low level. Therefore, the segment block Seg5 of the display device DISP is lighted off.

Step S16: Change the outputs at the ports PH7-PH0 to low level. Therefore, the segment block Seg6 of the display device DISP is lighted off.

Here, the program returns to the step S6. In other words, under the condition that the back cover is open and the switch SW1 is off, the camera does nothing. Now assuming that a film cartridge is set in and the back cover is closed at a time when the program is repeating the foregoing routine, on detection of the closure of the back cover in the step S10, the program then advances to a step S19.

Step S19: Examine the content of the back cover closure detection flag BPF. Since, here, the closure of the back cover is just detected, it remains "0". So, a step S20 follows.

Step S20: Set the flag BPF to "1".

Step S21: Check the cartridge load detection switch SWPTIN. Since the camera has been loaded with film, a step S23 follows.

It is to be noted that if, here, the film is not present, steps S24-S29 are not executed, but in a step S22, the cartridge load detection flag PTF is cleared and the program advances to the step S12.

Step S23: Set the cartridge load detection flag PTF to "1".

Step S24: Call a DXIN subroutine.

Figures 5A, 5B:
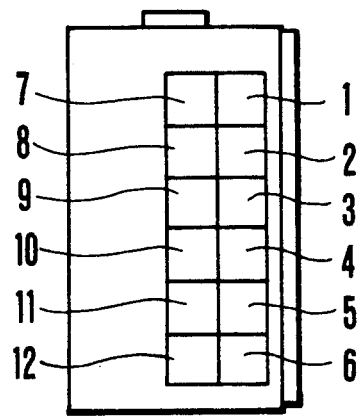
FIGS. 5(*a*) and 5(*b*) are an elevation view and a table for explaining the DX code.
Figure 7:
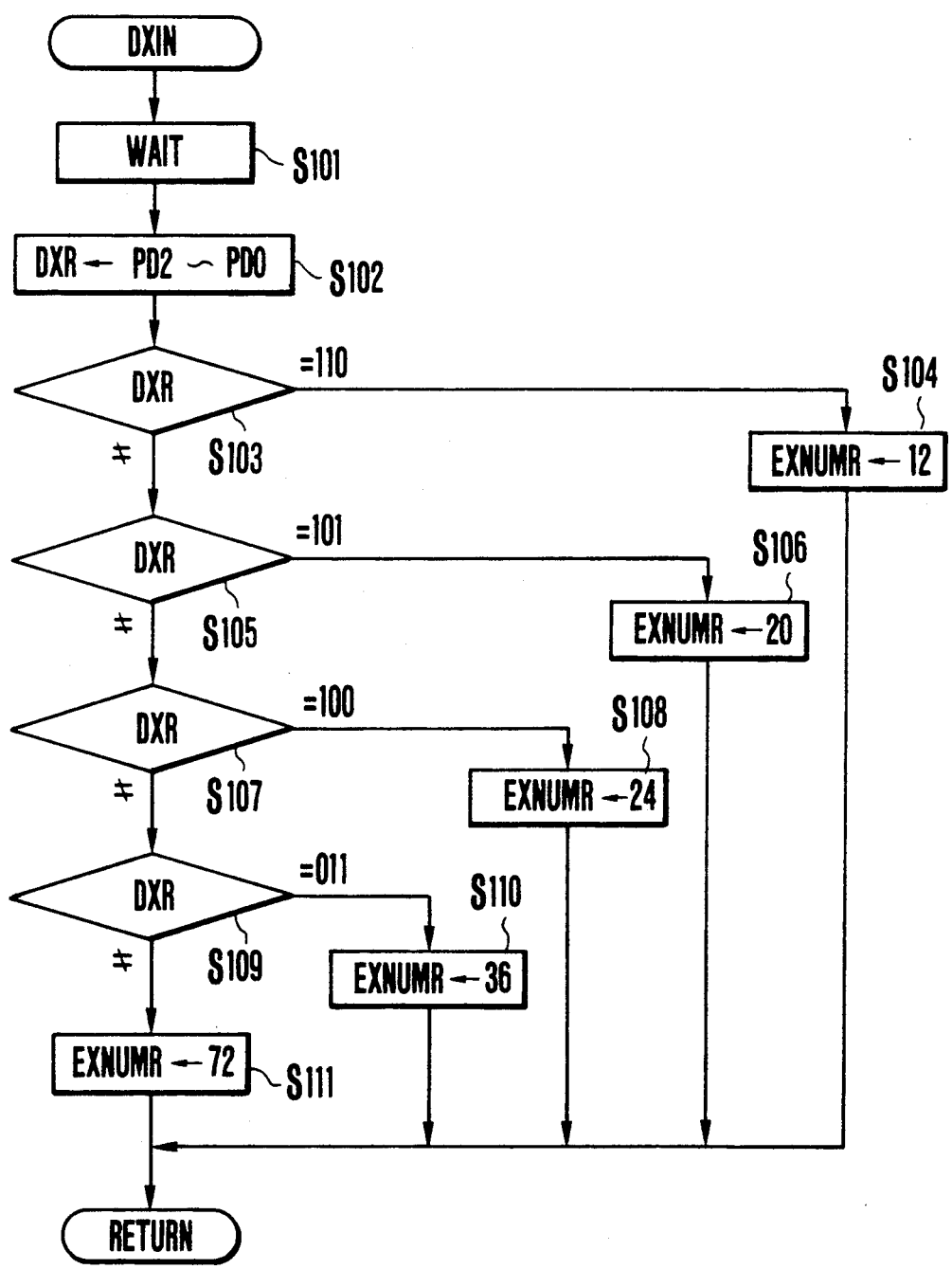
FIG. 7 and FIG. 8 are flowcharts (subroutines).

Here, the DXIN subroutine is explained by using FIGS. 5(a) and 5(b) and FIG. 7.

As shown in FIG. 5(a), on the side wall of the film cartridge, there are twelve contact areas 1-12. Of these, the areas 1 and 7 are used as the common electrodes in checking the electrical conduction of every one of the other areas. By this, one can know information representing the ISO sensitivity/latitude/the number of exposures of the used film. This is the DX code. In the present embodiment, among others, the areas 8, 9 and 10 are particularly relevant, because they define the number of frames available to shots. It should be noted that the DXIN subroutine is to read this number and set the information.

FIG. 5(b) shows the definition of the numbers of exposures by the combinations of the conducting states of the areas 8, 9 and 10 where "ON" represents the conducting state, and "—" represents the non-conducting state.

According to the flowchart of FIG. 7, the DXIN subroutine is described below.

Step S101: Wait a predetermined period of time so as to ensure the stability of contact between the contact areas of the DX code on the cartridge and the probes (not shown) in the cartridge chamber of the camera. It takes 100-500 msec. in the general case.

Step S102: Read in the levels of the input ports PD2-PD0 to evaluate the DX information. The conducting area is taken as "0" and the non-conducting area as "1" and the result is stored in the register DXR. This information is then used for determining the number of exposures.

Steps S103 and S104: If the content of the register DXR is "110", "12" is stored in the exposure state memory register EXNUMR, thus memorizing that the 12-exposure film is in use. Subroutine return then occurs.

Steps S105 and S106: Likewise, if the register DXR = 101, "20" is stored in the register EXNUMR. Return then occurs.

Steps S107 and S108: If the register DXR = 100, "24" is stored in the register EXNUMR. Return then occurs.

Steps S109 and S110: If the register DXR = 011, "36" is stored in the register EXNUMR. Return then occurs.

Step S111: If the content of the register DXR does not fit the aforesaid steps S103-S109, "72" is stored in the register EXNUMR. Return then occurs.

When the DXIN subroutine ends, the program advances to a step S25.

Step S25: Check whether or not the pre-wind switch SWPRW is pushed. If off, a step S26 follows.

Step S26: Store the number of automatic loading frames, or "3", in the register WINDR for memorizing the number of wound frames of film.

Step S27: Put "0" to the film transport direction flag DRF. Incidentally, in the flag DRF, "0" represents the film pulling-out, or winding direction, and "1" represents the film rewinding direction.

Step S28: Call a WIND subroutine.

Figure 6:
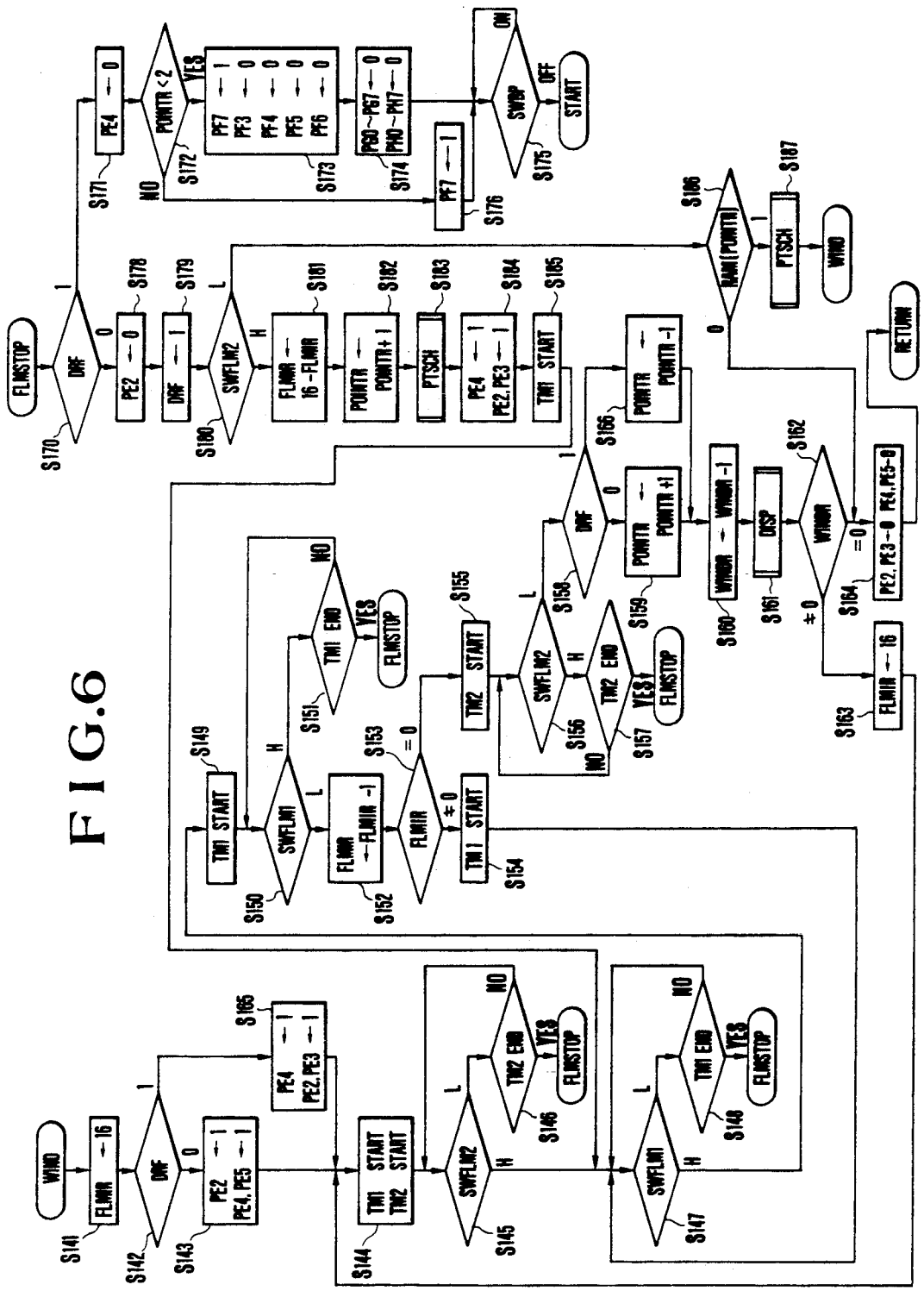
FIG. 6 is a flowchart (subroutine).

Here, the WIND subroutine is described according to the flowchart of FIG. 6.

Figure 12:
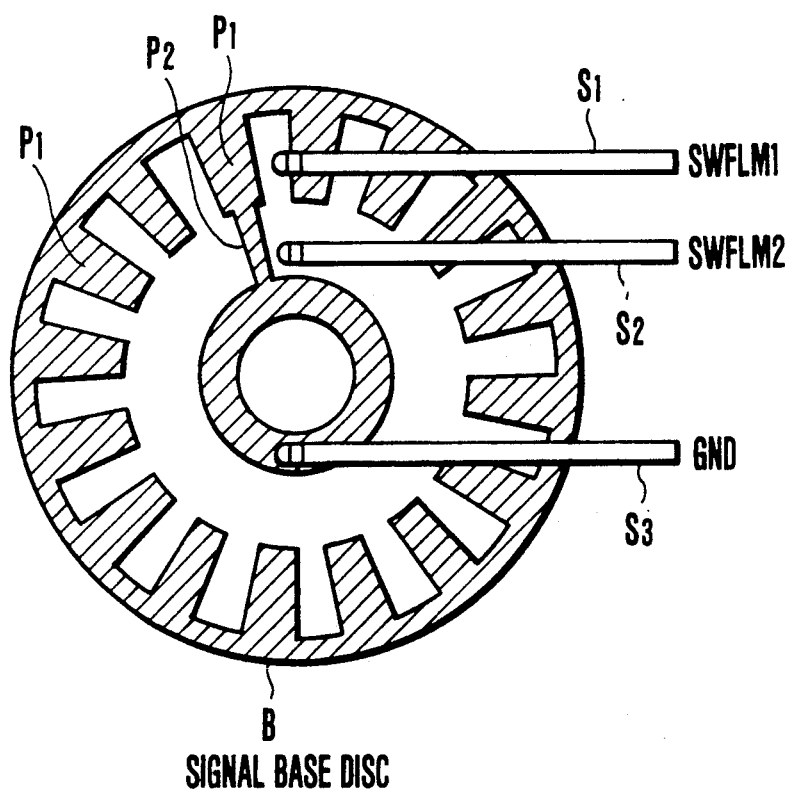
FIG. 12 is a top view of an example of the film transport signal generating switches.

Step S141: Put "16" into the register FLMIR for counting film pulses. The term "film pulse" used herein means that as shown in FIG. 12, during the time when the film is advanced one frame, a signal base disc B rotates just one revolution in association with motion of a sprocket, for example, which rotates while following the movement of the film, and, of the three fixed signal contacts, the contact S1 cooperates with the disc B to produce 16 pulses as a signal SWFLM1, as the potential at the contact S1 is dropped 16 times to the ground pattern. Therefore, by counting the number of times the contact S1 comes into contact with the pattern portion P1 to drop the signal SWFLM1 to the ground level, or the input port PD4 becomes low level, the microcomputer COM can know the amount of movement of the film. Another signal SWFLM2 is used for finding the stopped position of the film. The position at which, as the contact S2 touches the pattern portion P2 to drop the signal SWFLM2 to the ground level, the input port PD5 becomes low level, is taken as the stopped position of the film. It should be noted that the construction of the signal base disc B and the number of divided pattern portions of the signal SWFLMI must be determined by the moving speed of film and the accuracy of stop control, which depend on the mechanisms and motor actually used. It is, therefore, to be understood that these features are not necessarily confined to those shown in FIG. 12.

Step S142: Examine the content of the film transport direction flag DRF. Since, here, it becomes "0" by the step S27, a step S143 follows.

Step S143: Change the outputs at the ports PE2, PE4 and PE5 to high level. Responsive to this, the motor driver DMF supplies electric current to rotate the motor MF for film winding in the normal direction, while simultaneously opening the motor MR for film rewinding. Thus, forward (winding) transport of the film is started.

Step S144: Start timers TM1 and TM2 for detecting that the signal SWFLM1 and the signal SWFLM2 are varying within respective times.

Steps S145 and S146: Test if the signal SWFLM2 changes from low to high level before the timer TM2 ends. When the timer TM2 ends before the signal SWFLM2 becomes high, it implies that the film did not move, and the step S146 is followed by a subroutine FLMSTOP. A description of the subroutine FLMSTOP is given later. As the film advances normally, when change of the signal SWFLM2 to high level is detected, a step S147 follows.

Steps S147 and S148: Test if the signal SWFLM1 changes from low to high level before the timer TM1 ends. When the timer TM1 ends before the signal SWFLM1 becomes high, as it implies that the film has stopped, the step S148 is followed by the subroutine FLMSTOP. When the signal SWFLM1 becomes high before that, a step S149 follows.

Step S149: Start the timer TM1 again.

Steps S150 and S151: Test if the signal SWFLM1 changes from high to low level before the timer TM1 ends. When the timer TM1 ends before the signal SWFLM1 becomes low, as it implies that the film has stopped, the step S151 is followed by the subroutine FLMSTOP. When the signal SWFLM1 becomes low before that, a step S152 follows.

Step S152: Store what is obtained by subtracting "1" from the content of the film pulse count register FLMIR in the register FLMIR.

Step S153: Check whether or not the content of the register FLMIR has become "0". Since the register FLMIR has been set to "16" at first in the step S141, it is still "15". Therefore, a step S154 follows.

Step S154: Start the timer TM1 again.

Subsequently, the procedure of the steps S147-S154 is repeated. When the content of the register FLMIR becomes "0", or the film is transported through the length of one frame, the program advances to steps S153-S155.

Step S155: Start the timer TM2 again.

Steps S156 and S157: Check whether or not the signal SWFLM2 can become low level before the timer TM2 ends. If the end of the timer TM2 is earlier, it is also considered that the film has stopped. So, the subroutine FLMSTOP then follows. When the signal SWFLM2 becomes low before the end of the timer TM2, a step S158 follows.

Step S158: Check the film transport direction flag DRF. Since it is now "0", a step S159 follows.

Step S159: Increment the content of the point register POINTR by "1", thus indicating that the film has advanced one frame in the forward direction.

Step S160: Subtract "1" from the content of the number-of-transported-frames memory register WINDR.

Step S161: Call the display subroutine DISP to carry out displaying.

Incidentally, the details of the display subroutine DISP will be described in detail later.

Step S162: Check whether or not the content of the register WINDR that stores the number of wound-/rewound frames of film has become "0". The register WINDR was initially set to "3" in the step S26, and because "1" was subtracted in the step S160, leaving "2", a step S163 follows.

Step S163: Put "16" again in the register FLMIR. Return to the step S144 then occurs and the procedure of the steps S144-S163 described above is repeated. When the content of the frame number memory register WINDR becomes "0", in other words, when the transportation of the first three frames set in the step S26 is completed, the program advances to a step S164.

Step S164: Change all the outputs at the ports PE2--PE5 to low level to short-circuit-brake both of the motor MF for film winding and the motor MR for film rewinding. Thus, the film is rapidly stopped from moving.

Here, the automatic loading is completed and return to the main routine occurs. Incidentally, the remaining part of the WIND routine and the subroutine FLMSTOP are described later.

Step S29: Because the automatic loading has been completed, this information is stored by writing "1" representative of the completion of an exposure in each of those locations of the RAM which are indicated by the register POINTR=0-2. (Since it is the automatic loading, no exposures have been made, but this is rather convenient to use in expressing the program.)

After the automatic loading has ended, when the light measuring switch SW1 is turned on, the program advances from the step S12 to a step S31.

Step S31: Put the output of the A/D converter ADC, or the information representing the measured value of light, into the input ports PB7-PB0, which are then transferred to and stored in the register BVR.

Step S32: Subtract the content of the register SVR, or the information representing the preset value of sensitivity of the used film by a film speed setting means (not shown), from the BV value stored in the register BVR and store the result in the register EVR for the exposure value or EV.

Step S33: Subtract the content of the register TVR, or the information representing the preset value of shutter speed by a shutter speed setting means (not shown), from the content of the register EVR and store the result as the aperture value information in the register AVR. It is to be noted that the instructions shown by the steps S31-S33 are based on the operation of the shutter speed priority exposure mode, but the AE camera of the present embodiment should not be specified by AE mode in operation.

Step S34: Discriminate whether the continuous frame shooting mode switch SWHS is on/off. Now assuming that it is off, then a step S35 follows.

Step S35: Output low level at the output port PF5. Therefore, the segment Seg4 remains lighted off.

Step S36: Check the film transport direction flag DRF. Because it indicates the forward direction, or "0", a step S37 follows.

Step S37: Discriminate whether the release switch SW2 is on/off. Now assuming that it is off, then a step S38 follows.

Step S38: Call the display subroutine DISP.

Figure 8:
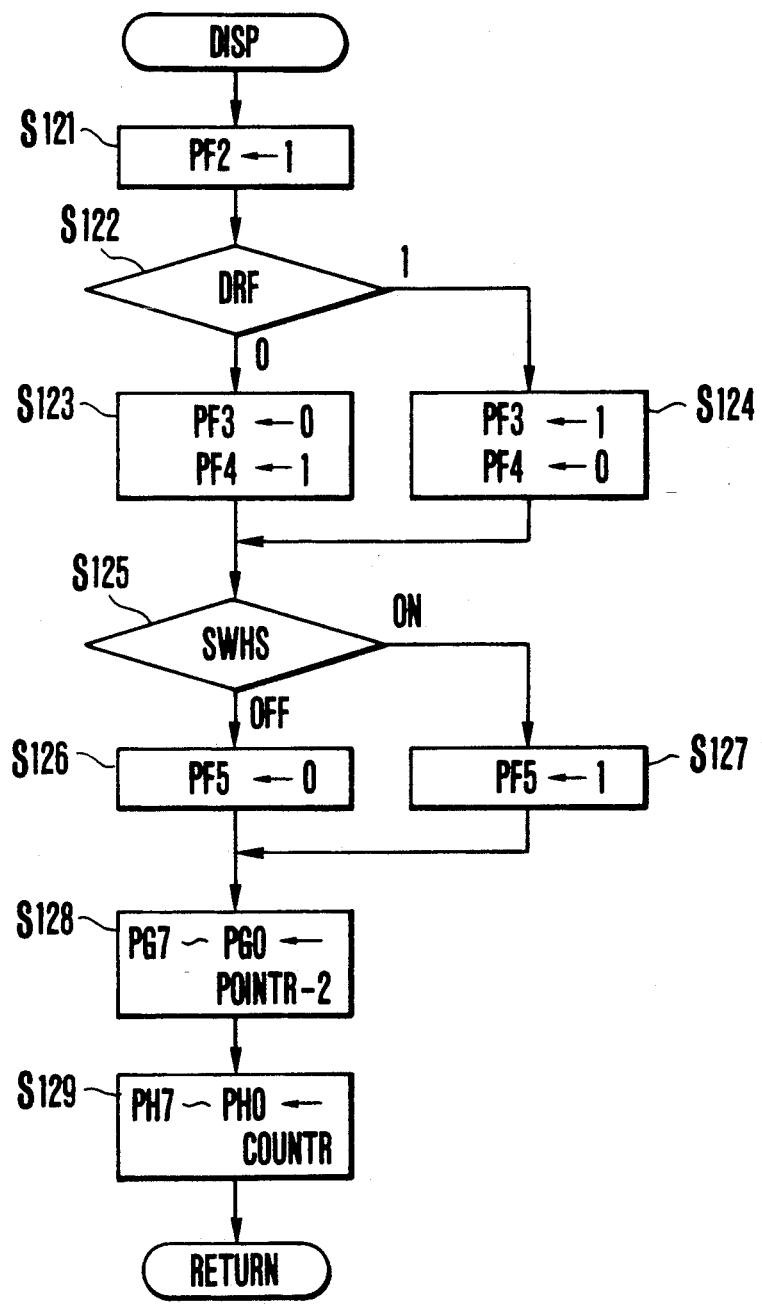

Here, the display subroutine DISP is described by reference to the flowchart of FIG. 8.

Step S121: Change the output at the port PF2 to high level. Since the display subroutine DISP is made to be called only when, as the camera is loaded with film, the film cartridge load flag PTF is "1", the segment Seg1 is lighted on, thus indicating that the film is loaded.

Steps S122 through S124: Check the film transport direction flag DRF. If it indicates the forward direction, a step S123 follows, causing the output port PF3 to produce low level, and the port PF4 to produce high level. Thereby the segment Seg2 is lighted off, while the segment Seg3 is lighted on. If it indicates the backward direction, a step S124 follows, causing the output port PF3 to produce high level, and the port PF4 to produce low level. Conversely to the step S123, the segment Seg2 is lighted on while the segment Seg3 is lighted off. Hence, the direction in which the film is transported can clearly be displayed.

Step S125 through S127: Discriminate whether the continuous frame shooting mode switch SWHS is on/-off. If off, a step S126 follows, causing the output port PF5 to produce low level, so that the segment Seg4 is lighted off. If the continuous frame shooting mode switch SWHS is on, a step S127 follows, causing the output port PF5 to produce high level, so that the segment Seg4 is lighted on. Incidentally, the continuous frame shooting mode is described later.

Step S128: Put the value obtained by subtracting "2" from the content of the film position memory register POINTR onto the output ports PG7-PG0. Thereby, the current film position is displayed on the segment block Seg5. The reason of subtracting "2" is, as is apparent from FIG. 11, that the register POINTR contains the data of three frames for automatic loading and the initial value of the register POINTR is "0". Incidentally, the content of the register POINTR is assumed not to vary in this step.

Step S129: Place the content of the exposed frame number memory register COUNTR onto the output ports PH7-PH0. By this, the number of exposed frames is displayed on the segment block Seg6. The program advances to a subroutine return.

When having called the display subroutine DISP, with the light measuring switch SW1 in ON state after the completion of the automatic loading but before the first frame is shot, a display of FIG. 13(a) is presented. The reason why nothing appears on the segment block Seg6 is that the decoder driver DR3 is of zero suppress form. If the zero suppress is removed, "0" will appear. Also, in general, many frame counters are of the type that what number the next exposed frame has is shown (for instance, if any one frame is not yet shot, the display is presented as "1".) If this convention is adopted, the step S129 in the flow of the display subroutine DISP might be modified so that COUNTR+1 is placed onto the output ports PH7-PH0. For this case, at the present state, "1" is displayed on the segment block Seg6. It does not matter which is chosen.

Having done the presenting of the display in the step S38, the program returns to the step S6. It is to be noted that since such provision is made that once the automatic loading is done, the back cover closure detection flag BPF gets "1" in the step S20, the advance from the step S19 to the step S12 occurs without carrying out any more automatic loading.

When the photographer turns on the release switch SW2 subsequently to the light measuring switch SW1, the program advances from the step S37 to a step S40 in a release subroutine of FIG. 9.

Step S40: Output the aperture value information stored in the register AVR to the output ports PC7-PC0. Thereby the aperture value information is transmitted to the diaphragm drive device DAV;

Step S41: Change the output at the port PF0 to high level. Responsive to this, the diaphragm drive device DAV energizes the stepping motor to carry out a stopping-down operation of the diaphragm.

Step S42: Change the output at the port PF1 to high level. Thereby the transistor TR3 is rendered conducting to supply electric current to the magnet MG3. Thus, the main mirror starts to move upward (or to retract from the front of the shutter.)

Step S43: Wait for completion of the mirror-up, or for turning-on of the mirror-up/charge completion detecting switch SW4.

Step S44: Because the mirror-up has been completed, the output at the port PF1 is changed to low level, thus terminating the supply of electric current to the magnet MG3.

Step S45: Convert the shutter time information stored in the register TVR from the number-of steps form to the real time form.

Steps S46 through S48: Change the output at the port PE0 to, and maintain at, high level for a predetermined period of time. Thereby the transistor TR1 is rendered conducting to supply electric current to the magnet MG1. Thus, the leading curtain of the shutter runs.

Step S49: Count the real time of the shutter speed as obtained in the step S45.

Step S50: Change the output at the port PE1 to high level to render the transistor TR2 conducting, thus starting supply of electric current to the magnet MG2. Thereby the trailing curtain of the shutter starts to run.

Step S51: Wait for turning-on of the trailing curtain running completion signal SWCN2.

Step S52: Because the running of the trailing curtain has been completed, the output at the port PE1 is changed to low level, thus terminating the supply of electric current to the magnet MG2.

Step S53: Change the output at the port PF0 to low level. Responsive to this, the diaphragm drive device DAV rotates the stepping motor in the reverse direction, thus returning the diaphragm to the full open aperture.

Step S54: Change the output at the port PE6 to high level. Responsive to this, the motor driver DMC energizes the charge motor MC to rotate in the normal direction, thus initiating an operation of charging the shutter and other mechanisms and moving the mirror downward. (The main mirror is moved downward despite the normal rotation of the charge motor MC.)

Step S55: Wait for turning-off of the charge completion signal SW4.

Step S56: Because the charging has been completed, the output at the port PE6 is changed to low level to effect braking on the charge motor MC.

Step S57: Check the film cartridge load flag PTF. If PFT=1 the cartridge is loaded, and step S58 follows. But, if the cartridge is not loaded, the film winding-/rewinding operation of the step S58 and the ensuing steps is unnecessary. Therefore, return from here to the step S6 of FIG. 4 occurs.

Step S58: Because the exposure of one frame has ended, the content of the exposed frame count register COUNTR is incremented by one. Therefore, the content of the register COUNTR changes from "0" to "1".

Step S59: Write "1" in that location of the RAM which is indicated by the register POINTR that memorizes the film position information. This means that as the content of the register POINTR is "3" (because the current film position is the first frame), a flag representing that the first frame was exposed has been set.

Step S60: Check the film transport direction flag DRF. Because the direction is now normal, a step S61 follows.

Steps S61 & S62: Check the value obtained by subtracting the current content of the film position memory register POINTR from what is obtained by adding "2" to the content of the register EXNUMR that represents the maximum possible number of exposures. This value, if "1", means that, as is better understood from FIG. 11, after the 35th frame of the 36-exposure film is exposed, while still in the forward direction of transportation, the film cannot move two more frames but only one more frame. In this case, the program advances from the step S61 to a step S70. Alternatively, this value, if "0", means that on similar consideration, the last frame of the 36-exposure film has come in the exposure aperture and, therefore, after this frame is exposed, the direction of transportation of the film has to be reversed. In this case, advances occur past steps: S61 →S62→S87. By now, discussion is up to the exposure of the first frame. So, the foregoing does not apply. Hence, the program advances past steps: S61→S62→S63.

Step S63: Check whether the continuous frame shooting mode switch SWHS is on or off. Now assuming that it is off, then a step S64 follows.

Step S64: Because the switch SWHS is off, the output at the port PF5 is made low, leaving the segment Seg4 lighted off.

Step S65: Put "2" into the wound frame number register WINDR. This is because the winding from the film position 1 to the film position 3 takes 2 frames.

Step S66: Call the WIND subroutine. Because the content of the register WINDR is "2" and the content of the register DRF is "0", a similar sequence to that described in connection with the step S28 of automatic loading with the WIND subroutine is carried out to transport in the forward direction, or winding, the film by two frames. During the operation of the subroutine, the register POINTR is incremented by two, so that "5" is stored therein.

Step S67: Call the DISP subroutine. The details of the DISP subroutine have already been described before. Because, here, the content of the register POINTR for memorizing the film position is "5", and the content of the register COUNTR for memorizing the number of exposed frames has become "1" in the step S58, the display device DISP gives a display of FIG. 13(b).

Steps S68 and S69: Check the drive mode switch SWDR. If off, as it implies that the continuous shooting mode is selected, and return to the step S6 of FIG. 4 occurs. If on, as it implies that the single shooting mode is selected, a step S69 is carried out to detect that the release switch SW2 is once turned off, before the return to the step S6 of FIG. 4 occurs.

The foregoing constitutes a basic sequence at the time of transporting the film in the forward direction in the camera of the present embodiment. In the usual mode, while transporting the film by every two frames at a time, exposure is made on every other frame, i.e., on the film positions 1→3→5 and so on.

Now, explanation is given to a case where such a sequence of exposures has reached the next to last frame of, for example, the 36-exposure film, or the 35th frame. In this case, the release operation is performed in a similar sequence to that described before until the step S61 of FIG. 9. Because the execution of the step S61 results in "EXNUMR+2-POINTR=1", the program advances to a step S70.

Step S70: Examine whether the continuous frame shooting mode switch SWHS is on or off. If off, a step S72 follows.

Step S72: Put "1" into the wind frame number register WINDR. This is to prevent a 2-frame winding operation from occurring when the possible maximum number of frames to be transported is only one.

After this, the WIND subroutine is called in the step S66 where according to the content of the register WINDR for memorizing the number of frames, in this instance, "1", the film is wound by one frame. The step S67 and those that follow are similar to those described before, presenting a display of FIG. 13(c) on the display device DISP, where the film position is the 36th frame, and the number of exposed frames is "18".

The 36th frame is then exposed. Because the film has been pulled out to the terminal end, it is after this that while rewinding the film by every two frames at a time, exposures are made on the successive not-yet-exposed frames. In a case where the film position at which an exposure has been made coincides with the 36th frame of the 36-exposure film, "EXNUMR+2-POINTR=0" results. Therefore, the program advances from the step S62 to a step S87.

Step S87: Change the film transport direction flag DRF to "1" representing the backward (rewinding) direction.

Step S88: Call a subroutine PTSCH. This subroutine is a program for searching how many frames the film should be rewound in the next cycle when the film can be transported to the position of the next not-yet-exposed frame.

Figure 10:
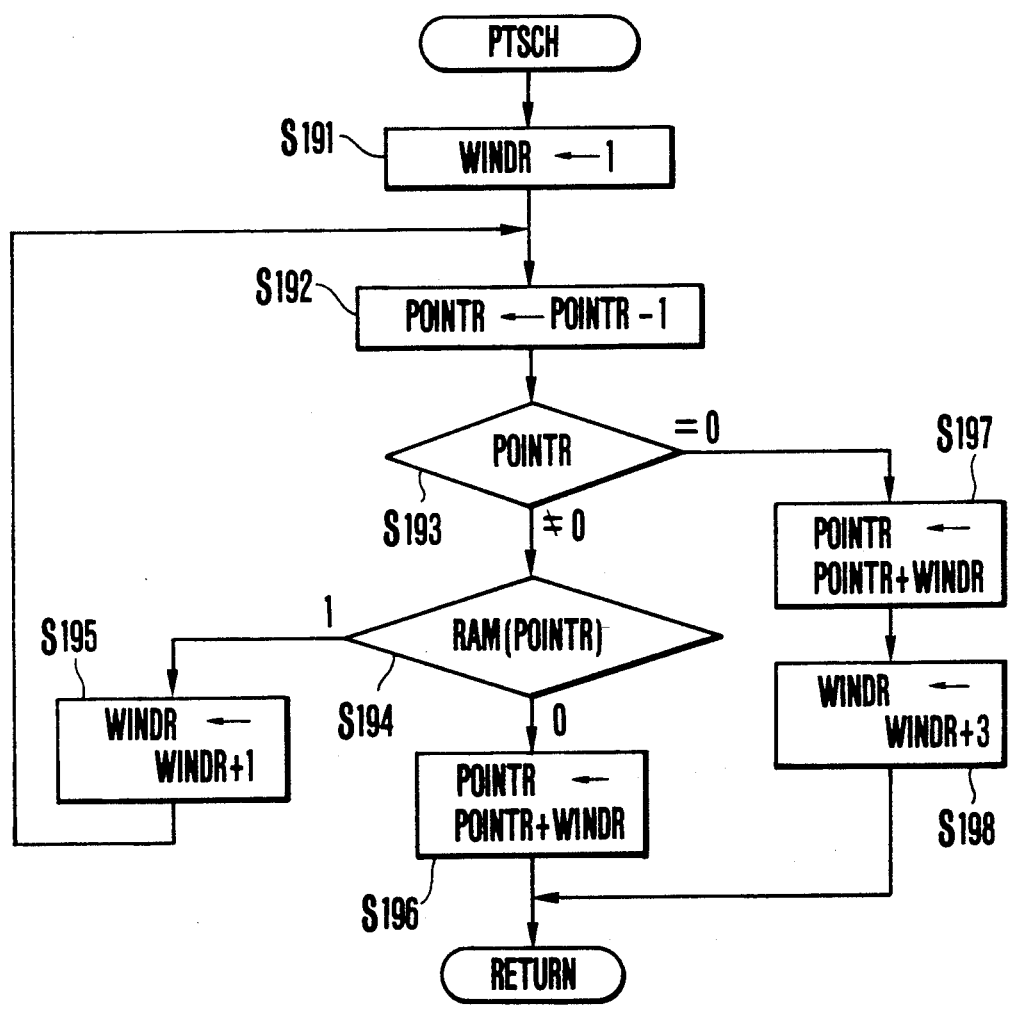
FIG. 10 is a flowchart (subroutine).

Here, the subroutine PTSCH is described by reference to FIG. 10.

Step S191: Set the content of the register WINDR for the number of frames to be transported to "1".

Step S192: Subtract "1" from the content of the film position memory register POINTR and store the result in the register POINTR.

Step S193: Check whether or not the content of the register POINTR has become "0". That the subroutine PTSCH has to be repeated until the content of the register POINTR becomes "0" means that the film frames are searched up to the first one but no fresh frame is found. Therefore, the searching is stopped and followed by a step S197. For other than "0", the program advances to a step S194.

Step S194: Check the content of the RAM which the register POINTR indicates. If "0", the frame which the register POINTR indicates is not exposed yet. Therefore, the next frame to be exposed is identified with that by the register POINTR. So, the searching is ended and followed by a step S196.

In another case where the content of the RAM is "1", as it implies that this frame is already exposed, a further searching is continued. For this purpose, a step S195 follows.

Step S195: Add "1" to the content of the register WINDR and store the result in the register WINDR. Return to the step S192 then occurs.

Thus, at a time when the step S196 is reached, a number representing how many frames should be rewound to bring the next not-yet-exposed frame in the exposure aperture is stored in the register WINDR, and the register POINTR contains a number resulting from the subtraction of the number of times the step S192 is recycled, or the value stored in the register WINDR from that content of the register POINTR which occurred at a time when the subroutine PTSCH was called.

Step S196: To indicate the current film position correctly, the register POINTR must restore that value which occurred at the time of calling the subroutine. For this purpose, a value of "POINTR+WINDR" is put into the register POINTR.

Under the condition that the number of frames to be rewound is stored in the register WINDR, a subroutine return occurs. In the usual winding mode, exposures are made on every other frame. With the 36-exposure film, for example, after all the odd-numbered frames and the 36th frame have been exposed, the next frame to be exposed is the 34th one. Therefore, "2" is stored in the register WINDR.

Step S197: In a case where no more fresh frames are found by the searching up to the leader of the film, the next cycle of film rewinding operation is to pull the remaining extracted area of the film into the cartridge, thus terminating the shooting. At first, similarly to the step S196, by adding the value of the register WINDR to the value of the register POINTR, the value of the register POINTR is returned to the initial value before the subroutine was called.

Step S198: Set the value of the register WINDR to "+3". This "+3" is given in a sense of the sufficient amount of film to be rewound such that the film is rewound to the first frame and further the film leader is all pulled into the cartridge. It is, therefore, to be understood that no particular significance is laid on a specific numeral "3". A subroutine return then occurs.

When the subroutine return occurs, the program advances from the step S88 of FIG. 9 to the step S66 for calling the subroutine WIND. The subroutine WIND, described in connection with the step S28, operates in the rewinding direction. The points in which it differs from that in the winding direction are described below.

In the rewinding mode, the content of the film transport direction flag DRF becomes "1" (in this instance, at the step S87.) Therefore, the step S142 of FIG. 6 is followed by a step S165.

Step S165: Change the outputs at the ports PE2, PE3 and PE4 to high level. By the motor driver DMF, the wind motor MF is opened. By the motor driver DMR, the rewind motor MR is supplied with electric current to rotate in the normal direction. Thus, rewinding (backward transportation) of the film is started. Up to the steps S144-S158, though the moving direction of the film is different, the sequence itself is the same as that in the normal rotation. In the step S158, the film transport direction flag DRF is "1". Therefore, the program advances to a step S166.

Step S166: This step is executed each time the film is transported one frame in the rewinding direction. Therefore, "1" is subtracted from the content of the register POINTR and the result is stored in the register POINTR.

The step S160 and those that follow are the same as those in the winding mode.

After the step S66 is passed, displaying is carried out in the step S67. For now, the flag DRF=1, the register POINTR=36, and the register COUNTR=19. Therefore, a display of FIG. 13(d) is presented.

The program returns to the main stream. As the light measuring switch SW1 is turned on again, when this is detected, the program advances past the steps: S12→S31→S32 . . . In the step S36, because the film transport direction flag DRF has changed to "1", the program advances from the step S36 to a step S73.

Step S73: Call the above-described subroutine PTSCH. The number of frames to be rewound until the next not-yet-exposed frame is stored in the register WINDR. Return then occurs. In the usual mode, the 34th frame is followed by the 32nd frame. Hence, "WINDR=2" is set in.

Steps S74 through S76: Check the content of the register WINDR stored by the subroutine PTSCH. If it is "1", the output at the port PF6 is changed to low level. If other than "1", the output at the port PF6 is changed to high level. It should be noted that the change of the display resulting from the change of the output at the output port PF6 gets significance when the continuous frame shooting mode switch SWHS is on. So, this is described in connection with the operation of turning on the switch SWHS.

After this, when the release switch SW2 is turned on, the release operation beginning with the step S40 of FIG. 9 is carried out in a similar manner to that described above until the step S60.

Step S60: Because DRF=1 (rewinding), the step S66 follows. Under the condition of DRF=1, the number of frames to be transported to the next not-yet-exposed frame enters the register WINDR in the step S73 of FIG. 4. Therefore, in the step S66 the backward transportation is normally carried out.

While the rewinding is being recycled in such a manner, exposures are made on the every other frame which are not yet exposed. In the usual mode, after shooting the fourth frame, a 2-frame rewinding operation follows, so that the second frame becomes the last frame to shoot. When the light measuring switch SW1 is turned on in this condition, the program advances past the steps: S12→S31→. . . →S36→S73 and the subroutine PTSCH is called. The details of the subroutine PTSCH have been described before. Yet, because there are no more fresh frames ahead of the second frame, the register WINDR=4 and the register POINTR=0 result. Therefore, a branch from the step S193 of FIG. 10 to the step S197 occurs. As a result, the register WINDR becomes "7" (by the step S198) and the register POINTR becomes "4" (representing now the second frame). Return then occurs.

After this, upon further depression of the release switch SW2, the program advances also past the steps of FIG. 9: S40→S41→. . . →S60→S66 and the subroutine WIND is called. Because, here, the register WINDR=7, the film transportation is carried out so as to rewind seven frames. But the remaining film out of the cartridge is four frames plus alpha. At a time during this rewinding operation, the rotation of the sprocket is stopped. From this time on, the signal SWFLM1 and the signal SWFLM2 are stopped from further variation. In either one of the steps S146, S148, S151 and S157 of FIG. 6, the timers end. Branch to the subroutine FLMSTOP then occurs. Here, the subroutine FLMSTOP is described by reference to FIG. 6.

Step S170: Check the film transport direction flag DRF. Because the rewinding has thus far been carried out, DRF=7. A step S171 then follows.

Step S171: Change the output at the port PE4 to low level, thereupon braking the rewind motor MR. Thus the rewinding drive comes to an end.

Step S172: Check the content of the register POINTR. If it becomes smaller than "2", it may be judged that at least the exposed area of the film is pulled into the interior of the cartridge before the rewinding of the film is stopped. If the film is fully rewound, the content of the register POINTR is counted down to zero (by the step S160). A step S173 then follows.

Step S173: Change the output at the port PF7 to high level. By this, the segment Seg1 blinks, because the output port PF2 is high level from the beginning. At the same time, the outputs at the ports PF3-PF6 are changed to low level, lighting off the segments Seg2-Seg4.

Step S174: Change all the outputs at the ports PG7-PG0 and PH7-PH0 to low level, lighting off the segment blocks Seg5 and Seg6.

At this time, a display of FIG. 13(e) is presented, indicating that the shooting ends.

Step S175: Wait for the back cover to be opened. It is nonsense to accept the switch SW1 or SW2 under the condition that the shooting ends. Here, therefore, opening of the back cover is waited for.

When opening of the back cover is recognized, the program jumps to the start and makes itself ready to use the next film cartridge.

What has been described above is the basic sequence of the camera of the present embodiment in which while the 2-frame winding operation is recycled, exposures are made, and, after the film end is reached, while the rewinding operation also with two frames at a time is recycled, those of the frames which have not been exposed in the winding mode are shot successively.

A case where jump to the subroutine FLMSTOP occurs except when the shooting ends is described below (FIG. 6).

As the film, because of some reason except for the end of the shooting, stops at a time during the backward transportation, when the signal SWFLM1 or the signal SWFLM2 has not varied until the respective timers TM1 and TM2 end, it also happens that the program advances to the step S170 and therefrom to the steps S171→S172. Because, in this case, the register POINTR≧2, a step S176 follows.

Step S176: Change the output at the port PF7 to high level. By this, of the segments Seg1-Seg3, the segment now in energization is changed to the blinking display.

Suppose a release is actuated from the state with the display of FIG. 13(d), and the film to rewind is stretched before even one frame is fully rewound, then a display of FIG. 13(f) is presented at this time.

After that, nothing is accepted until the back cover is opened. The return to the START in response to opening of the back cover is the same as that at the time of the end of the shooting.

In another case where as the film in the winding mode stops from some reason, jump to the subroutine FLMSTOP also occurs, because the film transport direction flag DRF=0, the program advances to the steps S170→S178.

Step S178: Change the output at the port PE2 to low level to brake the motor MF for film winding. Thus, the winding operation ends.

Step S179: Reverse the direction flag DRF (0→1). When the film being wound is stretched, it is then transported in the rewinding direction.

Step S180: Discriminate the level of the signal SWFLM2. If high level, as it implies that the film is stopping on the way with the next fresh frame out of registry with the exposure aperture, the film is rewound until that frame comes in registry with it by a step S181 and those that follow.

Step S181: Subtract the value of the register FLMIR from "16" and store the result in the register FLMIR. By knowing what number of pulses of the signal SWFLM1 the register FLMIR has counted down (from the initial value of "16") during the time when the film moves to the stopped position, it can be recognized how long the film has to be rewound to change the signal SWFLM2 to low level at which the next fresh frame falls in registry with the exposure aperture.

Step S182: Increment the content of the register POINTR by one. Because the film stops in the middle of winding, the film position indicated by the register POINTR remains unchanged from the earlier one than that by one frame. Here, the register POINTR is advanced one so that the earlier frame than that by one frame is not skipped in searching when the next cycle of calling the subroutine PTSCH is carried out.

Step S183: Call the above-described subroutine PTSCH to search where the film should be rewound to.

Step S184: Change the outputs at the ports PE2, PE3 and PE4 to high level. Responsive to this, the motor driver DMF opens the winding motor MF, and the motor driver DMR supplies electric current to rotate the rewinding motor MR in the normal direction, thus starting a rewinding operation of the film.

Step S185: Start the timer TM1 for checking the pulse interval of the signal SWFLM1.

From here, the program advances to the step S147 where at first, while counting down the number of pulses of the signal SWFLM1 corresponding to the value stored in the register FLMIR by the step S181, the film is rewound to remove the phase error resulting from the stretching of the film on the way. This operation is completed when the register FLMIR=0 results in the step S153 and when the signal SWFLM2 becomes low in the step S156. In the step S183, a rewinding operation is carried out to reach the value of the register WINDR which was found at a time when the subroutine PTSCH was called. (The routine WIND continues until WINDR=0 results in the step S162.) By this, the rewinding operation of the film is continued bring the next fresh frame into registry with the exposure aperture. Subsequently, while the film transportation to the rewinding direction is recycled, exposures are made on the successive fresh frames in a manner similar to the above-described operation.

Alternatively, assuming that the film being transported in the forward direction is stopped on the way in coincidence with the change of the signal SWFLM2 to low level, as one of the frames is just in registry with the exposure aperture, then the program advances from the above-described step S180 to a step S186.

Step S186: The stopping of the film in a just framed position results from either one of the two reasons that either the film to be wound does not move at all, and the step S146 is followed by the subroutine FLMSTOP, or that the film to be wound two frames at a time is stopped after it has been transported just one frame, and the step S146 is also followed by the subroutine FLMSTOP. So, that location of the RAM which the current content of the register POINTR indicates is checked to determine whether or not the frame now in registry with the exposure aperture is usable to shoot (not yet exposed). If it is usable to shoot, as there is no need to move the film any more, the program advances to the step S164 where subroutine return to the main routine occurs. Because the flag DRF is reversed in the step S179, an exposure sequence with rewinding of the film is subsequently carried out. If, as the film is being stopped, the frame now just in registry with the exposure aperture is the exposed one, the program advances from the step S186 to a step S187.

Step S187: Because there is a need to rewind the film to the fresh frame, the subroutine PTSCH is called.

Because the flag DRF is reversed in the step S179, the program returns to the step S141 where the film is rewound to the not-yet-exposed frame.

The subsequence is the same as the other cases.

This ends the explanation about the events of stopping the film by the stretching or the like.

Next, the manner in which the camera operates when the forced rewinding switch SWREW is pushed is described.

Step S17: Check whether the forced rewinding switch SWREW is on or off. If on, a step S80 follows.

Step S80: Change the direction flag DRF to "1" to carry out rewinding.

Step S81: Add "+3" to the content of the register POINTR which indicates the current film position and store the result in the film transport amount register WINDR. The meaning of the specific value of "+3" is similar to that described in connection with the step S198 of FIG. 10. Since the content of the register POINTR represents the amount of film thus far pulled out of the cartridge, and because "+3" is added and the result is stored in the register WINDR, the rewound film is fully sucked into the cartridge.

Step S82: Call the subroutine WIND to carry out rewinding. The flowchart is illustrated to advance to the step S38. But, if the normal rewinding operation is done, the program advances to the subroutine FLMSTOP of FIG. 6 at a time when the film is fully pulled into the cartridge in the subroutine WIND and therefrom to the steps: S170→S171→S172→S173→S174. Thus, the rewinding is completed in a manner similar to the basic sequence described before.

Next, a manner in which the camera operates when the forced pre-winding switch SWPRW is pushed is described.

With a film cartridge inserted, the back cover is closed to start an automatic loading. Assuming that the ON state of the switch SWPRW is detected at a time during the automatic loading, then the program advances to a step S30 in response to detection of the ON state of the switch SWPRW in the step S25 of FIG. 4.

Step S30: Add "+3" for the automatic loading to the value representing the maximum possible number of exposures stored in the register EXNUMR by the step S24 and store the result in the wound frame number register WINDR.

Subsequently, the flag DRF is set to the winding direction by a step S27, and the subroutine WIND is called in a step S28. With, for example, 36-exposure film in use, pre-winding of the film through the length of 39 frames including the three blank frames (film leader) for automatic loading is carried out. During the pre-winding, the register POINTR is counted up in the step S159 of the subroutine WIND. That content of the register POINTR which occurs when the pre-winding ends represents the last frame position. Therefore, when a camera release is later actuated, the direction flag DRF is reversed as the program advances to the steps S62→S87 of FIG. 9. Hence, exposures are made, while the rewinding operation is recycled. Because, in this case, the film all has been wound up without being exposed, each cycle of rewinding operation is to transport only one frame across the exposure aperture. (With the subroutine PTSCH called, return occurs when WINDR=1.) Actuation of the forced pre-winding switch SWPRW can be accepted even other than in the automatic loading, for example, even after some number of frames have been shot. If, in FIG. 4, the light measuring switch SW1 is off in the step S12, the film cartridge load detection flag PTF=1 (the cartridge is present) results in the step S13, and then the switch SWPRW is off in the step S17, the program advances to the step S18. If, here, the switch SWPRW is turned on, the program advances to a step S83.

Step S83: Check the direction flag DRF. Since, as the film is already in the rewinding direction, it is nonsense to allow pre-winding, the step S38 follows. At the time of the winding direction, a step S84 follows.

Step S84: Calculate the content of the register EXNUMR which represents the number of frames from the current film position to the terminal end position of the film plus "2" minus the content of the register POINTR and store the result in the WINDR register.

Step S85: Call the subroutine WIND. Pre-winding of the film from the current position is carried out.

Step S86: Because the pre-winding has ended, the direction flag DRF is reversed.

As the step S38 or the DISP step follows, the position, direction and the number of exposed frames of the film are displayed on the display device DISP. Subsequently, return to the main routine occurs. Making exposures while thus rewinding the film is not particularly different from the other cases. Even if, as the basic shooting is carried out with the film transported two frames at a time until the middle of winding, pre-winding has later been done, shots with the film being rewound are taken while calling the subroutine PTSCH to search for the next not-yet-exposed frame. Hence, there is no possibility of occurrence of double exposures or frame skipping.

Lastly, the continuous frame shooting mode selected by turning on the continuous frame shooting mode switch SWHS is described.

The camera of the present embodiment thus far described has a basic rule of transporting the film by two frames at a time. If the capacity of the electric power source, the power of the motor and the mechanisms such as the gear train are the same, the frame speed becomes slower than the conventional camera which transports the film by one frame at a time by a time space necessary to move the film by one frame, as a matter of course. So, to cope with the desire of increasing the frame speed in a certain photographic situations, provision for a mode of taking a continuous series of shots on successively adjacent frames of film in a manner similar to the conventional camera is made in the camera of the present embodiment. The camera is able to enter this mode in response to turning-on of the switch SWHS. Whether the switch SWHS is on or off is detected, as far as the flowcharts are concerned, in the step S34 of FIG. 4, the step S125 of FIG. 8, the steps S63 and S70 of FIG. 9. In these steps, on detection of an actuation of the switch SWHS, the program advances to the respective steps: S34→S39; S125→S127; S63→S71; and S70→S71, changing the output at the port PF5 to high level. Responsive to this, the segment Seg4 of the display device DISP appears itself, indicating that the actuation of the switch SWHS has been accepted. For example, from the display of FIG. 13(b), on acceptance of the actuation of the switch SWHS, a display of FIG. 13(g) is presented. After the acceptance of the actuation of the switch SWHS, the transport of the film is controlled in such a manner that, at first, at the time of the forward direction with the film transport direction flag DRF=0, the program advances to the steps of FIG. 9: S60→S61→S62→S63→S71→S72, or S60→S70 S71→S72 and, in the step S72, the register WINDR=1 is set, that is, the one-frame winding mode is indicated. Then, the subroutine WIND is called in the step S66. Since, at the time of the winding direction, from this time on, exposures are made while fresh frames of film are being pulled out of the cartridge, the continuous frame shooting mode is always established. Next, at the time of the backward direction with the flag DRF=1, the number of frames to be rewound after each exposure has been made is determined by the number of frames the film should be moved to the next not yet exposed frame, despite the choice of the continuous frame shooting mode. In the step S73 of FIG. 4, the subroutine PTSCH is called to find the number of frames from the present position to the next fresh frame and the result is stored in the register WINDR. If the resultant content of the register WINDR is determined in the step S74 to be "1", an equivalent film transport to the continuous frame shooting mode can be done. If other than "1", that is, "2" or more, as it implies that this is impossible to do, branch to the step S75 occurs, changing the output at the port PF6 to high level. Thus, the display of the segment Seg4 is changed to the blinking form, warning that no more continuous series of exposures can be done.

Concretely speaking, for example, in a case where pre-winding has been done from the beginning, a number of successively adjacent fresh frames are left even at the time of the rewinding direction, thus permitting a continuous series of exposures to be made. In another case where the usual mode has been operated with the film transported in the forward direction by two frames at a time to the terminal end, at the time of the rewinding direction, however, the remaining fresh frames are not adjacent to each other. Therefore, even if the switch SWHS is actuated, the camera is not switched to the continuous frame shooting mode. In this case, the segment Seg4 blinks. For example, from the display of FIG. 13(d), on actuation of the switch SWHS, a display of FIG. 13(h) is presented instead.

In the present embodiment, to shoot the next frame, the film is wound by every two frames, leaving a not-yet-exposed frame between the successive two of the exposed frames. When rewinding the film, the film is stopped in each of the successive not-yet-exposed frames as it is rewound by every two frames to make an exposure. It is possible to take shots in both of the film winding and rewinding modes, thereby giving an advantage of reducing the time lag due to the exchange of the film cartridge to a small fraction necessary merely for loading the camera with the film cartridge.

Moreover, in a situation where it is better to give priority to the frame speed as in the continuous shooting mode, the above described two-frame winding operation is automatically cancelled, thus removing the demerit due to the use of the additional capability of the present embodiment.

It is to be noted that in the present embodiment, after a number of cycles of two-frame winding operation with the exposures on every other frame have been done, double exposures are prevented from being made even when the camera is switched to the continuous shooting mode, since the already exposed frames are skipped to make exposures on the fresh frames when the film is being rewound. Therefore, any one of the frames is not wasted.

Further, in the present embodiment, when the camera is switched to the continuous shooting mode, the display device indicates this, informing the photographer of the fact that the two-frame winding or rewinding operation can no longer be carried out.

Further, in the present embodiment, the display device warns the photographer that as the maximum possible number of cycles of two-frame winding operation have been done, the later selection of the continuous shooting mode is impossible.

Since, in the present embodiment, frames can be shot in two ways, i.e., when the film is wound and rewound, the time space necessary for exchanging the film cartridge is reduced to a minimum. Therefore, it is possible to provide a camera with which the photographer hardly ever misses good shutter chances. Moreover, even when the photographer encounters a situation where a faster frame speed must be given priority, he can rely on the continuous shooting mode. On selection of this latter mode, the above-described former mode is automatically canceled. Thus, the versatility is high.

Also, in the present embodiment, such a method of winding or rewinding by every two frames as described above can be freely used even in the film loading or early stage, or in the middle of the winding way. Therefore, in the exposure mode where the two-frame winding or rewinding method that is peculiar to this embodiment becomes inappropriate, it is possible not to select this method, but to select the ordinary winding or rewinding method.

Also, in the present embodiment, since the not-yet-exposed frame positions at the time of film winding are memorized, regardless of whether the film frames usable for shooting have even or odd numbers, exposures are made accurately on the not-yet-exposed frames at the time of film rewinding. Therefore, accidental double exposures or like problems do not occur.

Also, in the present embodiment, the maximum possible number of frames available for shooting is read from the DX code of the film cartridge and, based on this information, the changeover from winding to rewinding is determined. Therefore, the transfer from the last exposed frame in winding to the first frame to be exposed in rewinding can be smoothly performed and any sense of incompatibility is never given to the photographer.

Also, in the present embodiment, the camera can be switched even to the above-described pre-winding mode. This means that particularly in a case where after the two-frame winding has been done, one desires frequent use of high speed or continuous series of shots, the selection of the pre-winding method increases the opportunity for the high speed continuous series of shots.

In the present embodiment, by making provision for taking shots in both of the film winding and rewinding ways, it is possible to provide a camera which has reduced the possibility of missing shutter chances by shortening the impossible-to-shoot time at the time of film exchanging.

Also, in the present embodiment, the positions of the unexposed frames are memorized and, at the time of the rewinding as changed over from the winding, any one of these unexposed frames is positioned in registry with the exposure aperture with high reliability, thus ensuring that accidental double exposures are prevented from occurring.

Also, in the present embodiment, when to change over from film winding to rewinding is judged by taking into account both of the information of the DX code of the film cartridge and the stretching of the film. Therefore, the camera can cope with any type of film.

For example, with the film stretched at the time of the winding, whether the next exposure is made as the film stands, or after the film is rewound two frames or one frame, is determined by the information of the memorized unexposed frame positions. Therefore, the film is never wastefully consumed, and accidental double exposures can be prevented from occurring.

This is the same even with the DX-code-attached film. At the time of the rewinding as changed over from the winding, the film is not wastefully consumed and accidental double exposures can be prevented from occurring.

In the present embodiment, by making provision for taking shots both at the time of film winding and rewinding, it is possible to provide a camera which can reduce the possibility of missing shutter chances by shortening the impossible to-shoot time at the time of film exchanging, and further can prevent accidental double exposures from being made during the rewinding.

Also, in the present embodiment, both the wound amount of film and the number of exposed frames are displayed by a display device, thus enabling the photographer to accurately grasp the state of the present situation. Therefore, even when the method of winding by every two frames is used, he can accurately see the number of exposed frames. It is also possible to judge how much film has been wound in winding, and how much wound film remains in rewinding. This means that whether or not there is a merit in changing over from the method of winding or rewinding by every two frames to the ordinary method at the middle of the entire length of the film can be judged by looking at the above-described display device.

In the present embodiment, by making provision for taking shots both at the time of film winding and rewinding, the possibility of missing shutter chances can be reduced by shortening the impossible-to-shoot time at the time of film exchanging, and by looking at the display, the state of the present situation can be accurately grasped.

Also, in the present invention, as the winding approaches the end, when it is impossible to wind the film by two frames but possible to wind the film by only one frame, the method of winding by only one frame is selectively used, so that the film is never wastefully consumed.

Also, in the present embodiment, the information about the maximum possible number of frames usable for shooting is obtained previously by reading the DX code of the film cartridge. Before the film is stretched at the time of winding the last frame, the camera can sense the number of frames possible to advance in the next cycle of winding operation. Therefore, there is almost no time lag.

Since the usual maximum possible number of frames is an even number such as "12", "24" or "36", because the first frame is at the end of the automatic loading and the winding by every two frames is later recycled, the exposure of the last frame in winding must be followed always by the winding of only one frame. In this respect, the present embodiment becomes particularly advantageous.

In the present embodiment, it is possible to take shots both at the time of film winding and rewinding. Therefore, it is possible to provide a camera which enables the possibility of missing shutter chances to be reduced by shortening the impossible-to-shoot time at the time of film exchanging and further, even with the use of this method, all the available frames can be shot, thus eliminating the wasteful consumption of the film.

What is claimed is:

1. A camera comprising:
   film winding means for performing electrically-driven winding of a film;
   film rewinding means for performing electrically-driven rewinding of the film;
   first control means for causing said film winding means to wind the film whereby at least one film frame is left unexposed, and for causing said film rewinding means to rewind the film whereby the film is stopped at the position of the at least one unexposed frame, to expose the at least one unexposed frame at the time of the rewinding;
   mode setting means for setting a specific photographing mode; and
   second control means, responsive to setting of the specific photographing mode by said mode setting means, for causing said film winding means to wind the film for exposing every frame.

2. A camera according to claim 1, wherein said first control means causes said film winding means to wind the film by two frames and said film rewinding means to rewind the film by two frames.

3. A camera according to claim 1, further comprising display means, responsive to setting of the specific photographing mode by said mode setting means, for displaying the setting of the specific photographing mode.

4. A camera according to claim 1, wherein the specific photographing mode is a continuous shooting photographic mode.

5. A camera according to claim 3, wherein the specific photographing mode is a continuous shooting photographic mode.

6. A camera comprising:
   film winding means for performing electrically-driven winding of a film;
   film rewinding means for performing electrically-driven rewinding of the film;
   first winding control means for causing said film winding means to wind the film for exposing every frame;
   second winding control means for causing said film winding means to wind the film whereby at least one film frame is left unexposed;
   memory means for memorizing the position of the at least one unexposed frame when the winding is caused by said second winding control means;
   first rewinding control means for causing said film rewinding means to continuously rewind the film;
   second rewinding control means for causing said film rewinding means to rewind the film whereby the film is stopped at the position of the at least one unexposed frame based on information obtained from said memory means;
   mode setting means for setting a specific photographing mode;
   first selecting means, responsive to setting the specific photographing mode by said mode setting means, for forcibly selecting said first winding control means; and
   second selecting means, responsive to the selection of said first winding control means by said first selecting means, for forcibly selecting said first rewinding control means.

7. A camera according to claim 6, wherein said second winding control means causes said film winding means to wind the film by two frames.

8. A camera according to claim 6, further comprising display means, responsive to setting the specific photographing mode by said mode setting means, for displaying the setting of the specific photographing mode.

9. A camera according to claim 6, wherein the specific photographing mode is a continuous shooting photographic mode.

10. A camera according to claim 8, wherein the specific photographing mode is a continuous shooting photographic mode.

11. A camera comprising:
    film winding means for performing electrically-driven winding of a film;
    film rewinding means for performing electrically-driven rewinding of the film;
    winding control means for selecting either a first winding control mode which causes said film winding means to wind the film for exposing every frame, or a second winding control mode which causes said film winding means to wind the film whereby at least one film frame is left unexposed;
    memory means for memorizing the position of the at least one unexposed frame when the second winding control mode is selected;
    rewinding control means for selecting either a first rewinding control mode which causes said film rewinding means to continuously rewind the film, or a second rewinding control mode which causes said film rewinding means to rewind the film whereby the film is stopped at the position of the at least on unexposed frame based on information obtained from said memory means;
    first selecting means for selecting the second winding control mode; and second selecting means for selecting the second rewinding control mode when the second winding control mode has been selected by said first selecting means.

12. A camera according to claim 11, wherein the second winding control mode causes said film winding means to wind the film by two frames.

13. A camera according to claim 11, further comprising display means for displaying operations of the first winding control mode and the second winding control mode.

14. A camera comprising:
film winding means for performing electrically-driven winding of a film;
film rewinding means for performing electrically-driven rewinding of the film;
winding control means for selecting either a first winding control mode which causes said film winding means to wind the film for exposing every frame, or a second winding control mode which causes said film winding means to wind the film whereby at least one film frame is left unexposed;
first memory means for memorizing the position of the at least one unexposed frame when the second winding control mode is selected;
second memory means for memorizing either a winding state of the film or a rewinding state of the film;
rewinding control means for selecting either a first rewinding control mode which causes said film rewinding means to continuously rewind the film, or a second rewinding control mode which causes said rewinding means to rewind the film whereby the film is stopped at the position of the at least one unexposed frame based on information obtained from said first memory means;
first selecting means for selecting the second winding control mode;
second selecting means for selecting the second rewinding control mode when the second winding control mode has been selected by said first selecting means; and
prohibiting means for prohibiting said first selecting means from selecting the second winding control mode when information obtained from said second memory means indicates a rewinding state of the film.

15. A camera according to claim 14, wherein the second winding control mode causes said film winding means to wind the film by two frames.

16. A camera according to claim 14, further comprising display means for displaying operations of the first winding control mode and the second winding control mode.

17. A camera comprising:
film winding means for performing electrically-driven winding of a film;
film rewinding means for performing electrically-driven rewinding of the film;
control means for causing said film winding means to wind the film whereby at least one film frame is left unexposed, and for causing said film rewinding means to rewind the film whereby the film is stopped at the position of the at least one unexposed frame, to expose the at least one unexposed from at the time of the rewinding;
first memory means for memorizing an amount of film wound out from a film cartridge;
second memory means for memorizing the number of exposed frames of film; and
display means for displaying position information of the film based on information obtained from said first memory means and for displaying the number of exposed frames of film based on information obtained from said second memory means.

18. A camera according to claim 17, wherein said control means causes said film winding means to wind the film by two frames.

19. A camera according to claim 17, further comprising third memory means for memorizing either a winding state of the film or a rewinding state of the film.

20. A camera according to claim 19, wherein a direction of transportation of the film is displaced by said display means on the basis of information obtained from said third memory means based.

* * * * *

UNITED STATES PATENT AND TRADEMARK OFFICE
CERTIFICATE OF CORRECTION

PATENT NO. : 5,107,290
DATED : April 21, 1992
INVENTOR(S) : Ohsawa

It is certified that error appears in the above-identified patent and that said Letters Patent is hereby corrected as shown below:

<u>COLUMN 1</u>:

Line 33, "film is all" should be deleted.
Line 66, "which," should read --which--.

<u>COLUMN 2</u>:

Line 11, "frames are" should read --frames which are--.
Line 12, "to change" should be deleted.

<u>COLUMN 3</u>:

Line 47, "driver" should read --drivers--.

<u>COLUMN 4</u>:

Line 62, "2-FIG." should read --2-figure--.

<u>COLUMN 5</u>:

Line 29, "the are" should read --the segments 61A-61G. Other output terminals OUT2A-OUT2G are--.

Line 62, "of" should be deleted.

<u>COLUMN 7</u>:

Line 54, "winding" should read --winding,--.

UNITED STATES PATENT AND TRADEMARK OFFICE
CERTIFICATE OF CORRECTION

PATENT NO. : 5,107,290
DATED : April 21, 1992
INVENTOR(S) : Ohsawa

It is certified that error appears in the above-identified patent and that said Letters Patent is hereby corrected as shown below:

COLUMN 11:

Line 40, "real time" should read --real-time--.

COLUMN 14:

Line 50, "further" should be deleted.
   Line 59, "that in" should be deleted.

COLUMN 16:

Line 39, "that" should read --where--; and change "ends" to --has ended--.

COLUMN 17:

Line 63, "bring" should read --to bring--.

COLUMN 19:

Line 22, "up" should be deleted.

COLUMN 20:

Line 6, "a" should be deleted.
   Line 30, "S60→S70 S71→S72" should read --S60→S70→S71→S72--.
   Line 40, "not" should read -- not- --.
   Line 41, "yet exposed" should read --yet-exposed--.

UNITED STATES PATENT AND TRADEMARK OFFICE
CERTIFICATE OF CORRECTION

PATENT NO. : 5,107,290

DATED : April 21, 1992

INVENTOR(S) : Ohsawa

It is certified that error appears in the above-identified patent and that said Letters Patent is hereby corrected as shown below:

COLUMN 21:

Line 44, "hardly ever" should read --seldom--.
   Line 49, "canceled." should read --cancelled.--

COLUMN 22:

Line 49, "impossible to-shoot" should read
     --impossible-to-shoot--.

COLUMN 24:

Line 65, "on (first occurrence) should read --one--.

COLUMN 26:

Line 22, "from" should read --frame--.
   Line 40, "displaced" should read --displayed--.
   Line 41, "on the basis of" should read --based on--.
   Line 42, "means based." should read --means.--

UNITED STATES PATENT AND TRADEMARK OFFICE
CERTIFICATE OF CORRECTION

PATENT NO. : 5,107,290

DATED : April 21, 1992

INVENTOR(S) : Ohsawa

It is certified that error appears in the above-identified patent and that said Letters Patent is hereby corrected as shown below:

Column 22, line 47, "which can reduce" should read --which has reduced--.

Signed and Sealed this

Twenty-first Day of September, 1993

Attest:

BRUCE LEHMAN

Attesting Officer

Commissioner of Patents and Trademarks